US011481093B1

(12) United States Patent
Diaz et al.

(10) Patent No.: US 11,481,093 B1
(45) Date of Patent: Oct. 25, 2022

(54) METHOD AND SYSTEM FOR DETERMINING THE LOCATION IN 3D SPACE OF AN OBJECT WITHIN AN ENCLOSED OPAQUE CONTAINER

(71) Applicant: The United States of America as Represented by the Secretary of the Navy, Indian Head, MD (US)

(72) Inventors: Angel Diaz, White Plains, MD (US); David Rivera-Marchand, Alexandria, VA (US); Lonnie Frericks, King George, VA (US); Andrew Wojtkowski, Springfield, VA (US); Anthony Kummerer, LaPlata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 435 days.

(21) Appl. No.: 16/602,553

(22) Filed: Oct. 31, 2019

(51) Int. Cl.
| | |
|---|---|
| *G06F 3/0484* | (2022.01) |
| *G01V 5/00* | (2006.01) |
| *G06T 7/50* | (2017.01) |
| *G06F 3/04817* | (2022.01) |
| *G06T 3/40* | (2006.01) |
| *G01N 23/04* | (2018.01) |
| *G06F 3/0482* | (2013.01) |

(52) U.S. Cl.
CPC .......... *G06F 3/0484* (2013.01); *G01N 23/04* (2013.01); *G01V 5/0016* (2013.01); *G06F 3/0482* (2013.01); *G06F 3/04817* (2013.01); *G06T 3/40* (2013.01); *G06T 7/50* (2017.01); *G01N 2223/401* (2013.01); *G06T 2207/10116* (2013.01); *G06T 2207/30204* (2013.01)

(58) Field of Classification Search
CPC ................. G01V 5/0016; G01N 23/04; G01N 2223/401; G06F 3/04817; G06F 3/0482; G06F 3/0484; G06T 3/40; G06T 7/50; G06T 2207/10116; G06T 2207/30204
See application file for complete search history.

(56) References Cited

U.S. PATENT DOCUMENTS

| | | | |
|---|---|---|---|
| 6,031,890 A * | 2/2000 | Bermbach | G01V 5/0016 378/57 |
| 6,480,141 B1 * | 11/2002 | Toth | G01N 22/00 342/22 |
| 7,027,644 B1 | 4/2006 | Kim et al. | |
| 168,958 A1 | 7/2009 | Cozzini et al. | |
| 226,478 A1 | 9/2010 | Harding et al. | |

(Continued)

*Primary Examiner* — Mong-Shune Chung
(74) *Attorney, Agent, or Firm* — Fredric J. Zimmerman

(57) ABSTRACT

A method and system for determining the location in 3D space of an object of interest within the interior region of an enclosed, opaque container. The invention allows a user or operator to construct a three-dimensional representation of the interior region of the container to allow viewing of objects, components and substances within the interior region. The users or operators now have the opportunity to isolate a particular object of interest within the interior region that may be a threat, such as an explosive device or other energetic component. A disrupter device is aimed at the three-dimensional location and thereafter, the disrupter device fires a projectile or substance at the object of interest in order to disable or destroy the object of interest.

41 Claims, 13 Drawing Sheets

(56) References Cited

U.S. PATENT DOCUMENTS

| | | | |
|---|---|---|---|
| 8,111,808 B1 | 2/2012 | Wood | |
| 177,182 A1 | 7/2012 | Olesinski et al. | |
| 8,411,820 B1 | 4/2013 | Browder | |
| 8,548,563 B2 | 10/2013 | Simon | |
| 9,002,062 B2 | 4/2015 | Aller | |
| 9,129,427 B2 | 9/2015 | Golubovec et al. | |
| 9,268,058 B2 | 2/2016 | Peschman et al. | |
| 9,686,481 B1 * | 6/2017 | Graybill | H04N 5/32 |
| 10,019,015 B2 | 7/2018 | Johnson et al. | |
| 2019/0137651 A1 * | 5/2019 | Bendahan | G01V 5/0058 |
| 2019/0346382 A1 * | 11/2019 | Rothschild | G01V 5/0025 |

* cited by examiner

METHOD AND SYSTEM FOR DETERMINING THE LOCATION IN 3D SPACE OF AN OBJECT WITHIN AN ENCLOSED OPAQUE CONTAINER

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

FIELD OF THE INVENTION

The present invention relates to a method and system for determining the location in 3D space of an object within an interior of an enclosed, opaque container.

BACKGROUND

Conventional methods and systems to visualize and aim at the contents of the interior of an opaque package or container typically use a fiducial grid in conjunction with an x-ray radiation source. Visualizing the contents of the interior of the opaque item is necessary in order to identify any objects of interest. Typically, an object of interest is considered a suspicious object that may be an explosive device or some other type of energetic. The object of interest is usually adjacent to or surrounded by other objects that may not be deemed suspicious or threatening. A disrupter device or tool is aimed at the location of the object of interest. The disrupter device or tool then fires or propels a projectile or substance at the object of interest in order to disable or destroy the object of interest. However, such conventional techniques and methods limit the aiming position of the disrupter device exclusively to the position of the x-ray radiation source. Consequently, such a limitation significantly constrains the space in which operators or personnel may operate. Furthermore, if it is not feasible to fire the disrupter device from a particular location and/or angle due to sensitive obstructions, it will be necessary to re-position the x-ray radiation source so as to determine if there is a feasible line-of-fire from another position or angle that will not impact such sensitive obstructions or other objects not deemed to be threatening.

What is needed is a new and improved method and system for accurately visualizing the contents of an opaque item and determining the three-dimensional location of an object of interest located within the interior of an opaque item.

SUMMARY OF THE INVENTION

In some exemplary embodiments, the present invention is directed to a method and system for accurately visualizing the contents of an enclosed opaque container and determining the three-dimensional location of an object of interest located within the interior of an opaque item. Specifically, the method and system of the present invention allow a user or operator to construct a three-dimensional representation of the interior region of the enclosed opaque container so as to allow viewing of objects, components and substances within the interior region. The users or operators now have the opportunity to isolate a particular item of interest within the interior region that may be a threat, such as an explosive device or other energetic component. A disrupter device is aimed at the three-dimensional location and thereafter, the disrupter device fires a projectile or substance at the object of interest (i.e. target) in order to disable or destroy the object of interest. The system includes a digital camera, a display element or display screen, a processing element in electronic data signal communication with the digital camera and display element, and at least one memory medium in electronic data signal communication with the processing element. In some exemplary embodiments, the processing element comprises one or more processors. In an exemplary embodiment, the camera and display element are positioned or located adjacent to the disrupter device. In some embodiments, the camera, display element and processing element are realized by a smart phone. The camera is configured to provide live video feeds. The camera, display element, and processing element cooperate to provide augmented reality (AR) and virtual reality (VR) imagery. The processing element executes one or more algorithms, including advanced computer vision (ACV) and digital image processing algorithms, which provide visualization, based on a virtual reality environment and/or augmented reality environment. The system includes a collapsible frame having two partition members or walls. In some exemplary embodiments, the partition members are movably attached to each other such that the collapsible frame opens and closes like a book. Each partition member has a unique image and a plurality of tungsten fiducial markers. The collapsible frame is placed near the enclosed opaque container so that one partition member faces one side of the enclosed opaque container and the other partition member faces the other side of the enclosed opaque container. The computer vision algorithms enable recognition of the unique image on each of the partition members. A first x-ray film is placed opposite one side of the opaque item such that the enclosed opaque container is positioned between a first partition member and the first x-ray film. A second x-ray film is placed opposite another side of the enclosed opaque container such that the enclosed opaque container is positioned between a second partition member and the second x-ray film. Two x-rays are taken along planes that are orthogonal to the unique images on both partition members. The processing element determines orthogonality of the x-ray radiation with respect to the unique images on the partition members. Once the x-rays are taken, the x-ray images are digitized and imported into at least one memory medium that is in electronic data signal communication with the processing element. The tungsten fiducial markers are visible on the digitized x-ray images. Each digitized x-ray image is then scaled, positioned and oriented. The unique images on each partition member do not appear on the digital x-ray images. The processing element processes the images of the partition members captured by the camera and executes software that generates a virtual reality depiction of each unique image. The tungsten fiducial markers are represented by corresponding icons in the virtual reality depictions of the unique images. In an exemplary embodiment, each fiducial marker shown in a virtual reality depiction is represented by a different color icon. As a result, for each digital x-ray image, there is a corresponding virtual reality depiction of the predefined unique image that is on the real world partition member that was x-rayed. One at a time, each digital x-ray image is selected and imported to the processing element. For the first selected digital x-ray image, the first step is to retrieve the virtual depiction of the predefined unique image that is on the real world partition member that corresponds to that first selected digital x-ray image. Two fiducial markers on the virtual reality depiction are selected, one at a time, and are mapped to corresponding fiducial markers on the digital x-ray image in order to define a first reference point. The same mapping steps are done for the second digital x-ray image so as to produce a second reference point. During the mapping procedure, a user or operator can zoom in and out and/or drag the digital x-ray image for better accuracy. The processing element implements a scaling process that uses the reference points produced in the mapping step to calibrate the digital x-ray images to true size and position. In some embodiments, the scaling process allows the user or operator to input, by the graphical user interface, the real distance from the unique image on the real world partition member to the corresponding x-ray film. The aforementioned method steps generate a three-dimensional representation of the interior region of the enclosed opaque container which allows users or operators to view the objects, components, substances, etc. that are within the interior region. Objects of interest within the interior region are then identified and highlighted using geometrical shapes provided by the software executed by the processing element. The geometrical shapes can moved, scaled, rotated and deleted. The color of the geometrical shapes may be changed to distinguish between the object of interest and other objects that are not of interest. A calibration scheme is then implemented which provides disrupter sight-alignment. In the calibration scheme, two points in three-dimensional space are selected and used to create a vector that is aligned with the longitudinally extending axis of the bore of the disrupter device. The camera is shifted so that the view of the camera is aligned with the vector so as to provide a view as seen from the bore of the disrupter, also referred to as "boresight perspective". Therefore, the vector constitutes an aiming vector for the disrupter device. The disrupter device fires or propels the projectile along the aiming vector such that the projectile impacts the object of interest within the interior of the enclosed opaque container.

A significant feature of the present invention is that the advanced computer vision (ACV) algorithms executed by the processing element provide the camera, or other augmented reality (AR) device, with spatial awareness and enables generation of a three-dimensional (3D) rendering of the x-rayed contents of the enclosed opaque container in true space and position.

In some embodiments, the present invention is directed to a method and system for accurately visualizing the contents of an enclosed, opaque container and determining the three-dimensional location of an object of interest located within the interior of the enclosed opaque container. The method and system of the present invention allow a user or operator to construct a three-dimensional representation of the interior region of the enclosed, opaque container so as to allow viewing of objects, components and substances within the interior region. As a result, users have the opportunity to isolate a particular item of interest (i.e. target) within the interior region of the enclosed, opaque container that may be a threat, such as an explosive device or other energetic component. The enclosed, opaque container may be any type of nontransparent article having an interior region in which objects may be kept or stored. Typical enclosed opaque containers include luggage, knap sacks, brief cases, shipping crates, barrels or any other nontransparent container, box or package. The method of the present invention further comprises providing a first real world partition member having a surface with a predefined unique image thereon and a second real world partition member having a surface with another predefined unique image thereon. The predefined unique image on the first real world partition member is different than the predefined unique image on the second real world partition. Each real world partition member is fabricated from a relatively low density material and includes a plurality of fiducial markers. The first real world partition member is positioned so as to face one side of the enclosed, opaque container and the second real world partition member is positioned so as to face another side of the enclosed, opaque container. In some embodiments, the first real world partition member and second real world partition member are movably attached together so as to form a collapsible frame that can be opened or closed. The method includes providing a first digital data set that defines the unique image on the first real world partition member and a second digital data set that defines the unique image on the second real world partition member. The method includes providing an image capturing device, a display element, at least one memory medium and at least one processing element that is in electronic data signal communication with the image capturing device, display element and at least one memory medium. At least one processing element is programmed with the first digital data set and the second digital data set and is also programmed to generate a graphical user interface for display on the display element. The image capturing device captures the unique image on each real world partition member. At least one processing element processes the unique images captured by the image capturing device so as to generate a virtual reality environment based on a virtual reality coordinate system. The virtual reality environment includes virtual depictions of the real world partition members and the corresponding unique images thereon. The method includes generating x-ray radiation that penetrates the first real world partition member and the enclosed, opaque container so as to produce a first x-ray image and generating x-ray radiation that penetrates the second real world partition member and the enclosed, opaque container so as to produce a second x-ray image. The first x-ray image and second x-ray image are digitized so as to produce digital x-ray images. The digital x-ray images are imported into the memory medium. The method includes, for each real world partition member and corresponding digital x-ray image, displaying the virtual depiction of the real world partition member and the predefined unique image thereon, wherein the three-dimensional location of the virtual depiction is based on a virtual environment coordinate system. In an exemplary embodiment, the fiducial markers on the virtual depiction of the real world partition member are depicted as different colored icons and the location of each colored icon in the virtual depiction corresponds to the location of a corresponding fiducial marker on the real world partition member. A user uses the graphical user interface to select a first colored icon on the virtual depiction of the real world partition member. The selected first colored icon is then mapped to a corresponding fiducial marker shown in the digital x-ray image corresponding to the real world partition member so as to define a first point. A user then uses the graphical user interface to select a second colored icon on the virtual depiction of the real world partition member. The selected second colored icon is then mapped to a corresponding fiducial marker shown in the digital x-ray image corresponding to the real world partition member so as to define a second point. The method includes scaling, positioning and orienting the digital x-ray image corresponding to the real world partition member based on the mapping of the first colored icon and the second colored icon to the respective corresponding fiducial markers shown in the digital x-ray image. Thereafter, the scaled, positioned and oriented digital x-ray images are reviewed to determine if any object inside the opaque item warrants further examination or is considered an object of interest or a suspicious object. If it is determined that an object inside the opaque item warrants further investigation or is considered a suspicious object, then the method includes, for each scaled, positioned and oriented digital x-ray image, displaying, by the display element, the scaled, positioned and oriented digital x-ray image and the virtual depiction of the predefined unique image of the real world partition member that corresponds to the scaled, positioned and oriented digital x-ray image, selecting a reference geometrical shape from a plurality of reference geometrical shapes and dragging the selected reference geometrical shape over the scaled, positioned and oriented digital x-ray image, and matching the selected reference geometrical shape to an X-Y coordinate of the suspicious object shown in the scaled, positioned and oriented digital x-ray image so as to yield the three-dimensional (3D) location of the suspicious object in relation to the virtual depiction of the predefined unique images on the real world partition members. The color of the geometrical shapes may be changed to distinguish between the object of interest from other objects that are not of interest. A calibration scheme is then implemented which provides disrupter sight-alignment. In the calibration scheme, two points in three-dimensional space are selected and used to create a vector that is aligned with the longitudinally extending axis of the bore of the disrupter device. The camera is shifted so that the view of the camera is aligned with the vector so as to provide a view "as seen" from the bore of the disrupter, also referred to as "boresight perspective". Therefore, the vector constitutes an aiming vector for disrupter device. The disrupter device fires or propels the projectile along the aiming vector such that the projective impacts the object of interest within the interior of the enclosed, opaque container.

In some embodiments, the present invention is directed to a system for determining the location in 3D space of an object within an interior of an enclosed, opaque container. The system comprises a first real world partition member having a surface with a first predefined unique image thereon. The first real world partition member is positioned so as to face one side of the enclosed opaque container. The system includes a second real world partition member having a surface with a second predefined unique image thereon. The second real world partition member is positioned so as to face another side of the enclosed opaque container. Each real world partition member is fabricated from a relatively low density material and includes a plurality of fiducial markers. The system further includes an apparatus configured to generate a first x-ray radiation that penetrates the first real world partition member and the enclosed, opaque container so as to produce a first x-ray image that corresponds to the first real world partition member and which shows the fiducial markers of the first real world partition member and a view of the interior of the enclosed, opaque container from a first angle. The apparatus generates a second x-ray radiation that penetrates the second real world partition member and the enclosed, opaque container so as to produce a second x-ray image that corresponds to the second real world partition member and which shows the fiducial markers of the second real world partition member and a view of the interior of the enclosed, opaque container from a second angle. The system further includes a device to digitize the first x-ray image and the second x-ray image to produce a first digital x-ray image and a second digital x-ray image. The system further includes an image capturing device configured to capture an image and provide the captured in digital form, a display element, one or more processors in electronic data signal communication with the image capturing device and the display element, and at least one memory in electronic data signal communication with the one or more processors. At least one memory includes data storage resource for storing a first data set that defines the first predefined unique image and a second data set that defines the second predefined unique image. At least one memory further includes computer readable code executable by the one or more processors to:

generate a graphical user interface for display on the display element;

capture, by the image capturing device, the first predefined unique image on the first real world partition member and the second predefined unique image on the second real world partition member;

process, by the one or more processors, the captured first predefined unique image and second predefined unique image to generate a virtual reality environment that includes virtual depictions of the first real world partition member with the first predefined unique image thereon and the second real world partition member with the second predefined unique image thereon; and import the first digital x-ray image and a second digital x-ray image into the at least one memory medium.

For each real world partition member and corresponding digital x-ray image, at least one memory includes computer readable code executable by the one or more processors to display, by the display element, the virtual depiction of the predefined unique image and fiducial markers of the real world partition member. The fiducial markers are shown as a plurality of icons in the virtual depiction. Each icon is differentiated from the other icons and has a specific location that corresponds to a location of a corresponding fiducial marker on the real world partition member.

At least one memory includes computer readable code executable by the one or more processors to:

prompt a user to select, using the graphical user interface, a first icon on the virtual depiction of the real world partition member;

prompt a user to map, using the graphical user interface, the selected first icon with a corresponding fiducial marker shown in the digital x-ray image corresponding to the real world partition member so as to define a first point;

prompt a user to select, using the graphical user interface, a second icon on the virtual depiction of the real world partition member;

prompt a user to map, using the graphical user interface, the selected second icon with a corresponding fiducial marker shown in the digital x-ray image corresponding to the real world partition member so as to define a second point;

scale, position and orient the digital x-ray image corresponding to the real world partition member based on the mapping of the selected first icon and the selected second icon with the respective corresponding fiducial markers shown in the digital x-ray image that corresponds to the real world partition member; and prompt the user to review, using the display element, the scaled, positioned and oriented digital x-ray images to determine if there is an object of interest inside the enclosed opaque article.

At least one memory includes computer readable code executable by the one or more processors to, for each scaled, positioned and oriented digital x-ray image:

display, by the display element, the scaled, positioned and oriented digital x-ray image and the virtual depiction of the predefined image of the real world partition member that corresponds to the scaled, positioned and oriented digital x-ray image;

prompt a user to select, by the graphical user interface, a reference geometrical shape from a plurality of reference geometrical shapes and drag the selected reference geometrical shape over the scaled, positioned and oriented digital x-ray image; and prompt a user to match, using the graphical user interface, the selected reference geometrical shape to an X-Y coordinate of the object of interest shown in the scaled, positioned and oriented digital x-ray image so as to determine a location of the object of interest in 3D space in relation to the virtual depiction of the predefined images on the real world partition members.

Certain features and advantages of the present invention have been generally described in this summary section. However, additional features, advantages and exemplary embodiments are presented herein or will be apparent to one of ordinary skill of the art in view of the drawings, specification and claims hereof. Accordingly, it should be understood that the scope of the invention shall not be limited by the particular exemplary embodiments disclosed in this summary section.

DETAILED DESCRIPTION OF EXEMPLARY EMBODIMENTS OF THE INVENTION

Figure 1:
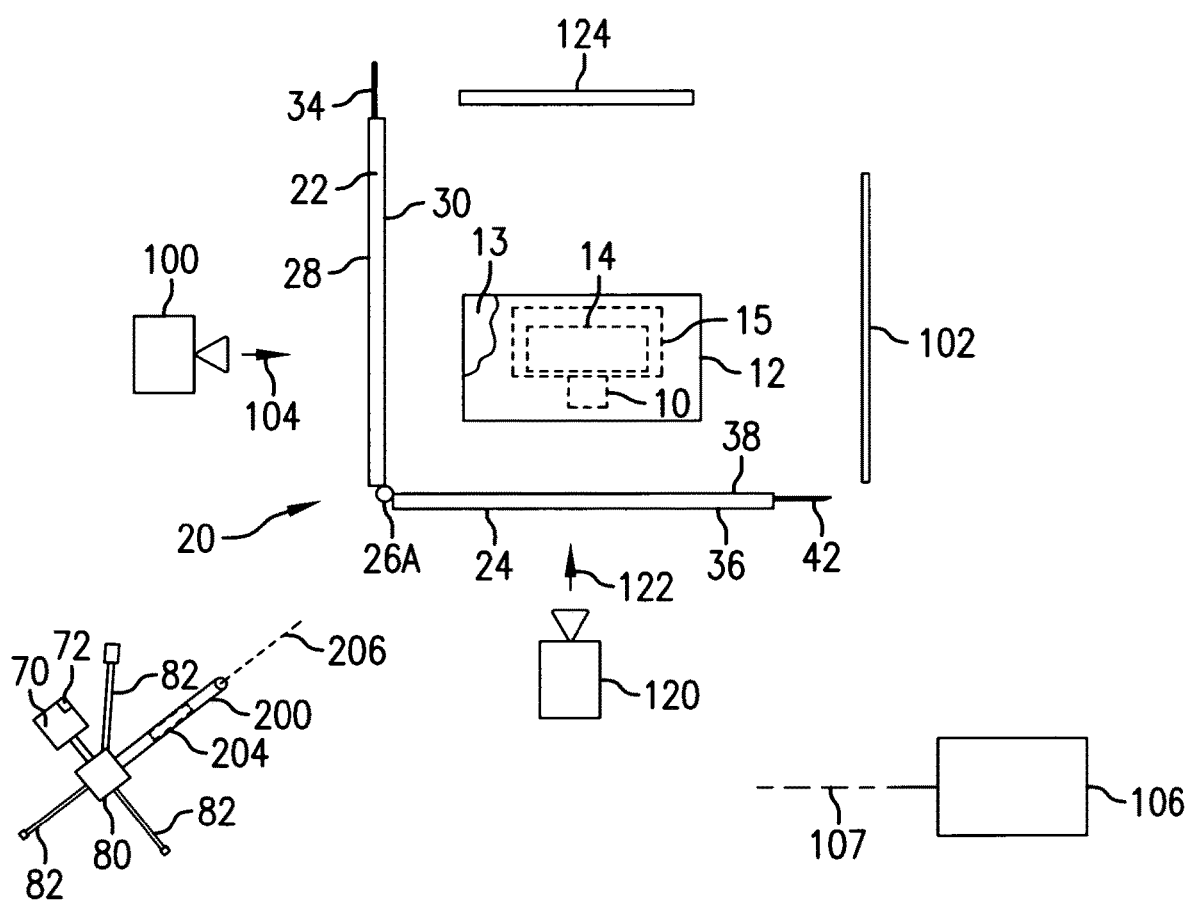
FIG. 1 is a plan view of a diagram illustrating the placement and location of components of the system of the present invention with respect to an enclosed opaque container that contains one or more objects that warrant investigation.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

It is to be understood that throughout this description, terms such as "vertical", "horizontal", "top", "bottom", "upper", "lower", "middle", "above", "below" and the like are used for convenience in identifying relative locations of various components and surfaces relative to one another in reference to the drawings and that the system of the present invention may be installed and used in substantially any orientation so that these terms are not intended to be limiting in any way.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

As used herein, the term "enclosed, opaque container" shall refer to enclosed, nontransparent containers, including luggage, knap sacks, bags, packages, shipping crates, cardboard boxes, wooden boxes, barrels or any other nontransparent structure or article configured to store, hold or carry items.

As used herein, the term "real world" refers to the real world physical environment and all matter existing therein, as opposed to a "virtual reality world" or an "augmented reality world".

As used herein, "processing element" or "processor" include, for example, circuits such as an ASIC (Application Specific Integrated Circuit), portions or circuits of individual processor cores, entire processor cores, individual processors, central processing units (CPU), signal processors having analog-to-digital conversion circuitry, programmable hardware devices such as field programmable gate array (FPGA) and or larger portions of systems that include multiple processors.

As used herein, "computer", "computer system" or "computing device" includes any of various types of computing or processing systems, including a personal computer system (PC), mainframe computer system, workstation, network appliance, Internet appliance, personal digital assistant (PDA), personal communication device, smart phone, notebook computer, desk top computer, tablet, television system, grid computing system, or other device or combinations of devices, or any device (or combination of devices) having at least one processing element that executes instructions from a memory medium. The aforesaid computing or processing systems are configured to open and process image files having formats, such as JPEG, PDF, PNG, etc.

As used herein, the terms "memory medium" or "memory" include non-transitory computer readable storage mediums and any of various types of memory devices or storage devices, such an installation medium, e.g., a CD-ROM, floppy disks, or tape device. "Memory medium" also includes a computer system memory or random access memory, such as DRAM, DDR RAM, SRAM, SDRAM, EDO RAM, Rambus RAM, and non-volatile memory such as a Flash, magnetic media, hard drive, optical storage, registers or other similar types of memory elements. "Memory medium" may include other types of memory as well or combinations thereof. The term "memory medium" may include two or more memory mediums which may reside in different locations, e.g. in different processing elements or computers that are connected over a network. The memory medium may store program instructions (e.g., embodied as computer programs) that may be executed by one or more processing elements.

In accordance with an exemplary embodiment of the invention, the components, process or method steps, and/or data structures may be implemented using various types of operating systems (OS), computing platforms, firmware, computer programs, application computer programs (e.g. "app" or "App"), computer languages, and/or general-purpose machines. Computer programs include any expression, in any language, code or notation, of a set of instructions intended to cause a system having an information processing capability to perform a particular function. The method may be run as a programmed process running on one or more processors or processing elements. Accordingly, the methods disclosed herein may be embedded on a non-transitory computer-readable storage medium, which comprises all the features enabling the implementation of the methods described herein, and which when loaded in a computer system, is able to carry out these methods.

Actual Method: Referring to FIG. 1, the present invention is directed to a method and system to accurately determine the three-dimensional location of a target or object of interest 10 that is located within the interior region of an enclosed opaque container 12. Other objects 14 and 15 (shown in phantom) are also located within the interior 13 of enclosed opaque container 12. In this example, as shown in FIG. 1, object 15 was positioned on top of object 14 and object 10 was positioned in front of object 14. Objects 14 and 15 also may be objects of interest, or they can be items to be avoided, or they can be neutral objects that are neither hazardous nor pose a threat. Specifically, the method and system of the present invention allow a user or operator to construct a three-dimensional representation of the interior region of an enclosed opaque container 12 so as to allow viewing of objects, components and substances within the interior region. The users or operators now have the opportunity to isolate a particular object of interest within the interior region that may be a threat, such as an explosive device or other energetic component. As will be described in the ensuing description, disrupter device 200 was aimed at the three-dimensional location and thereafter, disrupter device 200 fires a projectile or substance at the object of interest in order to disable or destroy target the object of interest. Examples of possible targets or objects that may be in enclosed opaque container 12 include containers, packages or bottles that may contain improvised-explosive-devices (IED), plastic explosives, explosive fluids therein or any other type of energetic devices.

Figure 2:
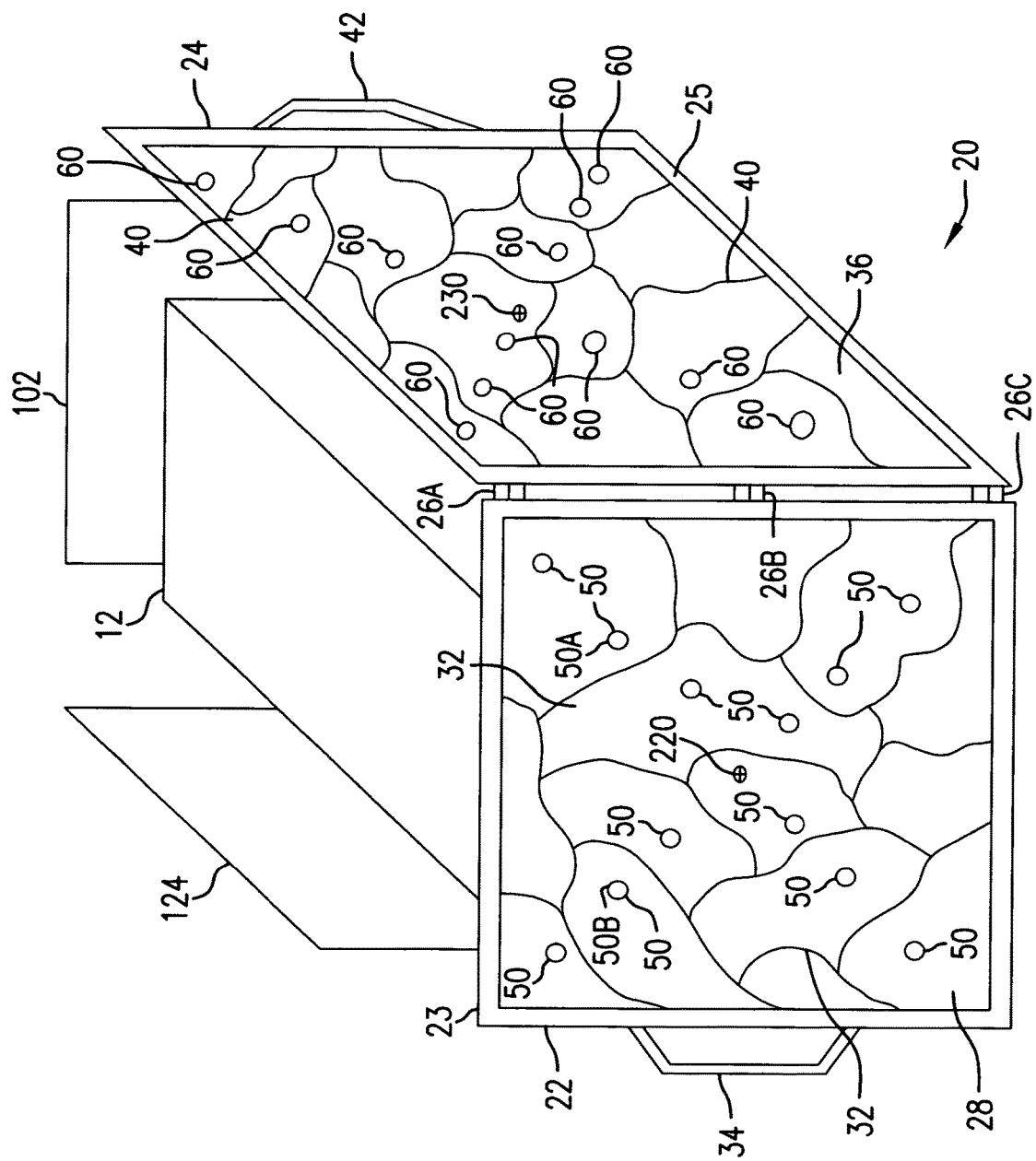
FIG. 2 is a perspective view of a collapsible frame shown in FIG. 1 and its location with respect to the enclosed opaque container, the collapsible frame having movable partition members.

Referring to FIGS. 1 and 2, the system comprises collapsible frame or template 20 that is placed near enclosed opaque container 12. Frame 20 comprises first partition member 22. First partition member 22 includes perimetrical support member 23. Frame 20 further includes second partition member 24. Second partition member 24 includes perimetrical support member 25. In an exemplary embodiment, partition member 22 and partition member 24 are pivotally or hingedly attached to each other via hinge members 26A, 26B and 26C such that frame 20 can open and close like a book. First partition member 22 and second partition member 24 may be fabricated from any type of suitable material, e.g. plastic, Plexiglas, rubber, etc. First partition member 22 includes first side 28 and opposite second side 30. First partition member 22 defines a first plane. First partition member 22 includes a predefined unique pattern or image 32 formed on the first side 28. In an exemplary embodiment, the predefined unique image 32 comprises a camouflage design. However, it is to be understood that predefined unique image 32 may be configured to have any other suitable design. Since first partition member 22 defines a plane, the camouflage image 32 of first wall 22 is also referred to herein as a "camouflage plane" or "camouflage image". Image 32 is visible only on side 28. Image 32 is formed or fabricated with low-density material. The formation of image 32 is described in detail in the ensuing description. First partition member 22 includes handle section 34. Similarly, second partition member 24 includes first side 36 and opposite second side 38. Second partition member 24 defines a second plane. Second partition member 24 includes a predefined unique image 40 on first side 36. Predefined unique image 40 is different than image 32 on first side 28 of first partition member 22. As a result of such a configuration, image 40 was distinct from image 32. In an exemplary embodiment, image 40 comprises a camouflage design. Since second partition member 24 defines a plane, camouflage image 40 is also referred to herein as a "camouflage plane" or "camouflage image". Image 40 is visible only on first side 36. Image 40 was formed or fabricated with the same low-density material used to form or fabricate image 32. The formation of image 40 is described in detail in the ensuing description. The purpose of images 32 and 40 is explained in the ensuing description. Second partition member 24 further includes handle 42. Handles 34 and 42 allow a user to open frame 20 and to carry or transport frame 20 when not in use. When frame 20 is closed, handles 34 and 42 contact each other.

Images 32 and 40 are random patterns. In one embodiment, these random patterns were created by suitable image creation software or raster graphics editor software that is configured to graphically design, create and edit images. The user sets or predefines the height and width of the images using the image creation software. Suitable image creation software includes, but is not limited to, Adobe® Photoshop, Adobe® Illustrator, Fatpaint® DrawPlus™, InkScape™ and Ultimate Paint™. Once images 32 and 40 are created, the images were engraved onto corresponding low-reflectivity and low-density surfaces using a laser-engraver. In an exemplary embodiment, the low-reflectivity and low-density surfaces are rugged and waterproof. In one embodiment, the low-reflectivity and low-density surfaces are plastic sheets, wherein each image is engraved onto a corresponding plastic sheet. In an exemplary embodiment, images 32 and 40 have substantially the same thicknesses. The camouflage patterns of images 32 and 40 are just examples and it is to be understood that patterns other than camouflage may be used as well. In some embodiments, first partition member 22 includes a frame to which a first plastic sheet, having image 32 thereon, is mounted or attached. In some exemplary embodiments, second partition member 24 includes a frame to which a second plastic sheet, having image 40 thereon, is mounted or attached.

The completed images 32 and 40 and their dimensions were processed with one or more commercially available algorithms in order to generate a data set for each image 32 and 40. In one exemplary embodiment, a desktop computer was used to process images 32 and 40 and the corresponding dimensions to generate the data set for each image 32 and 40. In another exemplary embodiment, images 32 and 40 and their corresponding dimensions were fed or inputted into a commercial-off-the-shelf (COTS) online algorithm that generates the data set for each image 32 and 40.

Referring to FIGS. 1 and 2, first partition member 22 further includes a first plurality of fiducial markers 50. Fiducial markers 50 were arranged in a predetermined pattern. In an exemplary embodiment, fiducial markers 50 were arranged in an "X" pattern. In an exemplary embodiment, each fiducial marker 50 is a tungsten, disc shaped fiducial marker. However, the quantity, pattern and shape of the fiducials markers may be varied in other embodiments. For example, in some embodiments, fiducial markers 50 were arranged in columns and rows. Similarly, second partition member 24 further includes a second plurality of fiducial markers 60. Fiducial markers 60 were arranged in a predetermined pattern. In an exemplary embodiment, fiducial markers 60 were arranged in an "X" pattern. In an exemplary embodiment, each fiducial marker 60 comprises a tungsten disc. However, the quantity, pattern and shape of fiducials markers 60 may be varied in other embodiments. For example, in some embodiments, fiducial markers 60 were arranged in columns and rows.

Referring to FIGS. 1 and 2, when frame 20 was positioned adjacent to the enclosed opaque container 12, frame 20 was opened so that first partition member 22 was perpendicular to second partition member 24 and first partition member 22 faces one side of enclosed opaque container 12 and second partition member 24 faces another side of enclosed, opaque container 12. In some embodiments, first partition member 22 and the second partition member 24 are separate pieces and are not joined together. In such embodiments, first partition member 22 and the second partition member 24 are placed at different locations. In other embodiments, only first partition member 22 or second partition member 24 is used, but not both.

The system of the present invention further comprises a camera that is in electronic data signal communication with a processing element. In an exemplary embodiment, the processing element comprises one or more processors. The processing element was programmed with the data sets that were generated by the aforementioned algorithms for each predefined unique image 32 and 40. Accordingly, the processing element was programmed with real life measurements of every single line, dot and detail that appears in camouflage images 32 and 40. In some embodiments, the camera and processing elements are separate components, such as a digital camera that is in electronic signal communication with a tablet computer or a desktop, laptop or notebook computer. In an exemplary embodiment, the camera and processing element are combined into a single computing device 70, which includes a built-in camera. In an exemplary embodiment, computing device 70 comprises a smart phone. For purposes of describing the system and method of the present invention, computing device 70 is described herein as a smart phone 70, which includes the internal processing element (not shown), camera 72 and display element or screen 74 (see FIG. 4). The processing element is in electronic data signal communication with camera 72 and display screen 74. Smart phone 70 includes home button 75, which is well known in the field of smart phones. As shown in FIG. 1, smart phone 70 is mounted on support structure 80, which has a plurality of leg members 82. In an exemplary embodiment, support structure comprises a tripod. The processing element of smart phone 70 is also programmed with one or more computer application programs or apps including an Advanced Computer Vision (ACV) image processing algorithm. The ACV image processing algorithm processes the image data of a live video feed provided by the camera 72. The ACV algorithm utilizes the data sets of images 32 and 40 to determine if an image captured in the live video feed is the same as image 32 or image 40. As a result, smart phone 40 is capable of recognizing the pre-defined patterns of camouflage images 32 and 40.

The Advanced Computer Vision software processes the live feed from camera 72 and creates a virtual reality environment (or "virtual environment") with virtual depictions of the real world environment images 32 and 40. The virtual reality environment was based on a virtual environment coordinate system or world coordinate system. The Advanced Computer Vision software executed by the processing element of smart phone 70 allows the user to define where everything will appear in the virtual reality environment. Therefore, the user may define the size of the virtual depictions of camouflage images 32 and 40. The user may also define or specify the location of the virtual depictions of camouflage images 32 and 40 with respect to the virtual environment coordinate system. In the virtual reality environment, the virtual depictions of camouflage images 32 and 40 were positioned in the same way as images 32 and 40 are positioned in the real world environment. Specifically, the virtual camouflage images 32 and 40 were joined to each other to form the same corner and are angulated about 90° apart just as they are in the real world environment. The fiducial markers 50 and 60 are visible in the virtual depictions of camouflage images 32 and 40, respectively, and are depicted as colored icons that are in the shape of buttons or discs. This feature is described in detail in the ensuing description. The virtual depictions of camouflage image 32 and 40 may be viewed on display screen 74 one at a time, during the step of selecting a fiducial marker by touching the corresponding colored icon shown in the virtual reality description. Both virtual depictions of images 32 and 40 may be seen simultaneously during the steps of "Calibrating", "Finding Orthogonality" or "Aiming," which are all described in detail in the ensuing description.

In other exemplary embodiments, computing device 70 includes a desktop computer having a display screen, keyboard and mouse and wherein the mouse is used to select the desired icons displayed on the computer display screen.

As described in the foregoing description, enclosed opaque container 12 has interior region 13 within which is located suspect object 10 and other objects 14 and 15. Suspect object 10 may be a bottle, box, carton, etc. that may hold explosive material or other energetic device. In order to obtain a view of the contents of enclosed opaque container 12, x-rays were taken of enclosed opaque container 12 from two different angles. As shown in FIG. 1, first x-ray machine 100 was positioned so that it faces first partition member 22 and first partition member 22 is between x-ray machine 100 and enclosed opaque container 12. As a result of this configuration, x-ray radiation emitted by x-ray machine 100 was directed to first side 28 of first partition member 22. First x-ray film 102 was positioned on the opposite side of enclosed article 12 such that enclosed article 12 is positioned between first partition member 22 and first x-ray film 102. In an exemplary embodiment, first x-ray film 102 was aligned with and substantially parallel to first partition member 22. Next, the first-x-ray was taken such that first x-ray radiation 104 passes through first partition member 22, enclosed opaque container 12 and first x-ray film 102. The plane of first x-ray radiation 104 is orthogonal to camouflage image 32 on first partition member 22. Since camouflage image 32 was made from a low-density material, first x-ray radiation 104 passes through camouflage image 32. As a result, camouflage image 32 does not appear on the first x-ray film 102. However, fiducial markers 50 of first partition member 22 and interior region 13 of enclosed opaque container 12, as seen from that angle, do appear on the first x-ray film 102. The image of first x-ray film 102 was scanned via digital scanner 106 so as to digitize the image on x-ray film 102 thereby producing a first digital x-ray image. In an exemplary embodiment, digital scanner 106 is in electronic data signal communication with computing device 70 via USB cable 107. In other embodiments, digital scanner 106 is in electronic data signal communication with computing device 70 via wireless connections or networks. The first digital x-ray image is then loaded into smart phone 70 where it is then imported into the smart phone App and then stored in the memory (e.g. ROM, RAM, etc.). In an exemplary embodiment, the first digital x-ray image is in the form of a JPEG image when it is imported into the smart phone app.

As shown in FIG. 1, second x-ray machine 120 was positioned so that it faces the first side 36 of second partition member 24 of frame 20 and second partition member 24 is between x-ray machine 120 and enclosed opaque container 12. As a result of this configuration, the x-ray radiation 122 emitted by x-ray machine 120 was directed to first side 36 of second partition member 24. Second x-ray film 124 was positioned on the opposite side of enclosed opaque container 12 such that enclosed opaque container 12 is between second partition member 24 and second x-ray film 124. In an exemplary embodiment, second x-ray film 124 was aligned with and substantially parallel to second partition member 24. Next, the second x-ray was taken such that second x-ray radiation 122 passes through second partition member 24, enclosed opaque container 12 and second x-ray film 124. The plane of second x-ray radiation 122 was orthogonal to camouflage image 40 on second partition member 24. Since camouflage image 40 was made from a low-density material, second x-ray radiation 122 passes through camouflage image 40. As a result, camouflage image 40 does not appear on second x-ray film 124. However, fiducial markers 60 of second partition member 24 and interior 13 of enclosed opaque container 12, as seen from that angle, do appear on second x-ray film 124. Second x-ray film 124 is digitally scanned with digital scanner 106 and loaded into smart phone 70 wherein it is imported into the smart phone App and stored in the memory (e.g. ROM, RAM, etc.) in smart phone 70. In an exemplary embodiment, the image of second x-ray film 124 is in the form of a JPEG image when it is imported into the smart phone app.

In another exemplary embodiment, a single x-ray machine is used. In such an embodiment, the x-ray machine is first set up so that the first x-ray radiation passes through first partition member 22 and enclosed opaque container 12 as described in the ensuing description. After the first x-ray is taken, the x-ray machine is then re-positioned and set up so that the second x-ray radiation passes through the second partition member 24 and enclosed opaque container 12.

Figure 3:
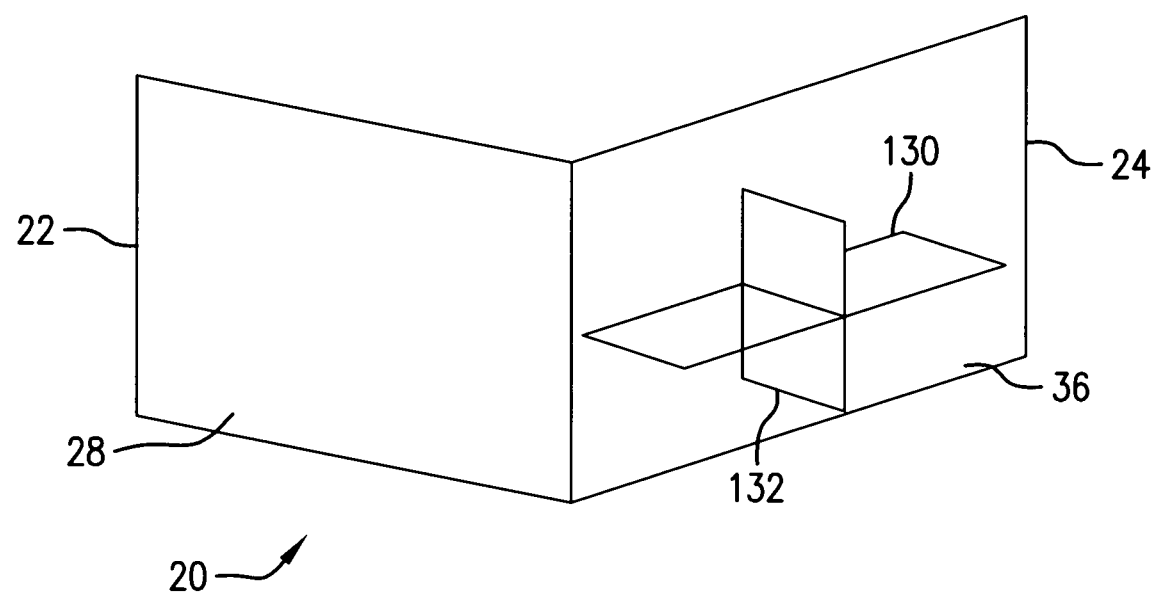
FIG. 3 is a diagram illustrating the determination of orthogonality of x-ray radiation directed at each partition member of the collapsible frame.

In an exemplary embodiment, first partition member 22 was substantially perpendicular to second partition member 24. In such a case, the method of the present invention implements an "Orthogonality Mode" in order to locate the position of x-ray machine 100 and x-ray machine 120 with respect to first partition member 22 and second partition member 24, respectively. Orthogonality is found or determined with a combination of virtual reality and augmented reality. The processing element of smart phone 70 executes software that determines orthogonality. Referring to FIG. 3, in order to establish orthogonality, the Advanced Computer Vision (CV) software executed by the processing element of smart phone 70 displays, by display screen 74, intersecting horizontal plane 130 and vertical plane 132 that are always perpendicular to each other and are adjacent to first partition member 22 or second partition member 24. For example, as shown in FIG. 3, horizontal plane 130 and vertical plane 132 are adjacent to first side 36 of second partition member 24 and intersect at the point where the axis of x-ray radiation 122 meets first side 36. This provides the user with a qualitative and intuitive indicator for orthogonality between the x-ray radiation and the partition member of interest (i.e. first partition member 22 or second partition member 24) as these intersecting planes 130 and 132 may be observed from the viewpoint of the x-ray machine 100 or x-ray machine 120. In order to accurately determine orthogonality, the "Calibration Mode" must be done first. The Calibration Mode was described in detail in the ensuing description. The software executed by the processing element of smart phone 70 also causes display element 74 to display "standoff distance" and a value referred to as "orthogonality factor" which is related to the "dot product" between a partition member's normal vector and the vector aligned with the axis of the x-ray radiation. This aids in quantifying orthogonality. Full orthogonality is achieved when the value equals "1".

In some embodiments, the Calibration Mode is implemented prior to finding "orthogonality". The "Calibration Mode" was described in detail in the ensuing description. Once the Calibration Mode has been implemented, it does not have to be implemented again during processing of the first x-ray image and the second x-ray image. For purposes of brevity and to facilitate understanding of the Orthogonality Mode, the ensuing description is in terms of the Calibration Mode having already been completed.

The beams of x-ray radiation 104 and 122 must be as orthogonal as possible to the surface of camouflage images 32 and 40, respectively, in order to achieve a high level of fidelity. During the Orthogonality Mode, live feed videos of first partition member 22 and second partition member 24 were routed to the smart phone App. The Advanced Computer Vision (CV) software executed by the smart phone App includes an algorithm that "sees" the intersection of the planes of first partition member 22 and second partition member 24 assuming the smart phone camera 72 is not orthogonal to either first partition member 22 or second partition member 24. Since camouflage images 32 and 40 are pre-defined as described in the foregoing description, the ACV software recognizes both camouflage images 32 and 40 simultaneously.

In some situations, finding orthogonality may not be necessary. The need to find orthogonality depends upon the user's assessment of the type of enclosed opaque container 12 or the object of interest 10 within enclosed opaque container 12.

Figure 4:
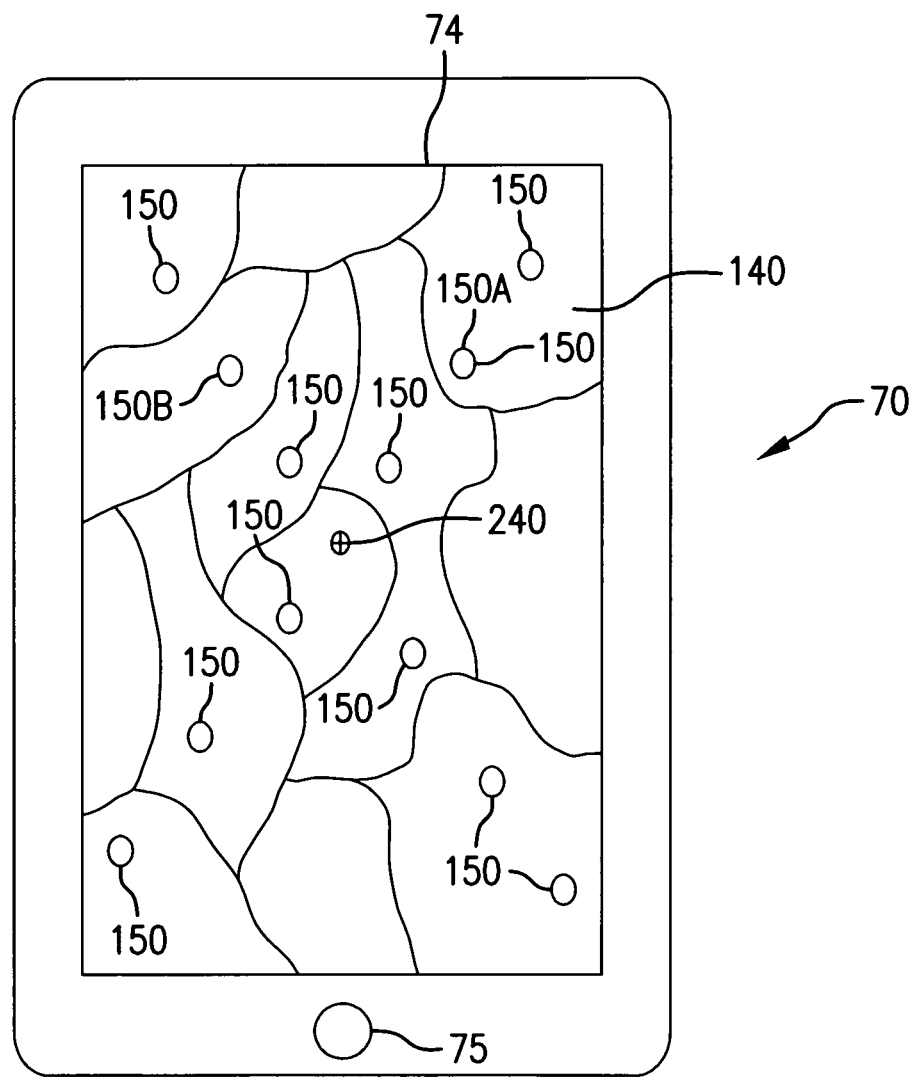
FIG. 4 is a view of smart phone displaying a virtual depiction of the predefined unique image and plurality of fiducial markers of a first one of the partition members shown in FIG. 2.

Each x-ray image was selected one at a time for processing. Processing each x-ray image includes scaling, positioning and orienting the x-ray image. The order in which the x-ray images are processed does not matter. For example, the first x-ray image derived from x-ray film 102 may be processed first and then the second x-ray image derived from x-ray film 124, or vice versa. Before any processing of x-ray images occurs, an x-ray image must be selected. Smart phone 70 implements an "X-Ray Selection Mode" which utilizes a virtual reality environment. Display screen 74 of smart phone 70 displays a menu that lists several icons, one of which being "X-Ray Selection Mode". When the user presses the icon labelled "X-Ray Selection Mode", two additional icons appear on display screen 74. One of the additional icons corresponds to first partition member 22 and the other icon corresponds to second partition member 24. The user then touches one of these icons and, in response, display screen 74 displays the x-ray image corresponding to the selected partition member of frame 20 along with an icon labelled as "Continue". Once the user touches the "Continue" icon, display screen 74 displays a virtual depiction of the camouflage image corresponding to the selected real world partition member of frame 20. As described in the foregoing description, the data sets defining the camouflage images were previously loaded into the smart phone App. As a result, the smart phone App is able to generate the virtual depiction of the camouflage images. In the virtual depiction of the camouflage image, the fiducial markers (e.g. tungsten discs) are depicted as different colored icons. The location of each colored icon in the virtual depiction corresponds to the actual location of a corresponding fiducial marker (e.g. tungsten disc) on the real world camouflage image of the selected real world partition member of frame 20. This depiction is illustrated in FIG. 4. As described in the foregoing description, first partition member 22 has camouflage image 32 and fiducial markers 50. Smart phone 70 displays, via display 74, a virtual depiction 140 of the camouflage image 32 and also displays a plurality of different colored circular icons 150 that represent fiducial markers 50 in first partition member 22. The location of each icon 150 corresponds to an actual location of a corresponding fiducial marker 50 in the first real world partition member 22. For example, icon 150A corresponds to real world fiducial marker 50A (see FIG. 2) in first real world partition member 22 and icon 150B corresponds to real world fiducial marker 50B in first real world partition member 22. Although the foregoing description is in terms of colored icons 150 being circular in shape, it is to be understood that icons 150 may be other shapes, e.g. square, oval, triangular, rectangular, etc.

Figure 5A:
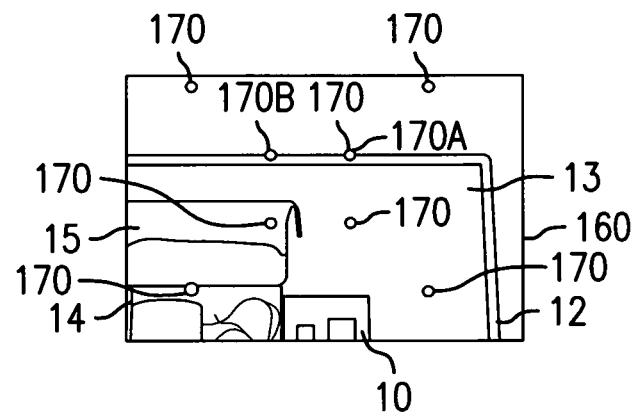
FIG. 5A is a diagrammatical representation of an x-ray image resulting from x-ray radiation passing through a first one of the partition members and the enclosed opaque container.
Figure 5B:
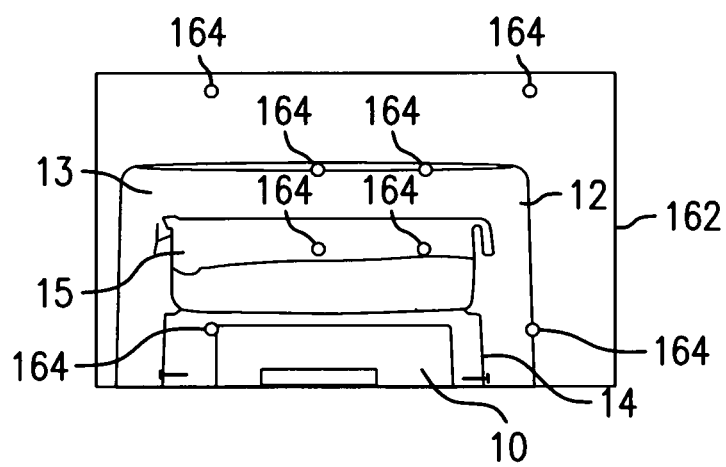
FIG. 5B is a diagrammatical representation of an x-ray image resulting from x-ray radiation passing through a second one of the partition members and the enclosed opaque container.

Referring to FIG. 5A, there is shown x-ray image 160 resulting from x-rays passing through first partition member 22 and enclosed opaque container 12. Fiducial markers 50 on first real world partition member 22 were shown as fiducial marker images 170 in x-ray image 160. Therefore, each fiducial image 170 corresponds to a fiducial marker 50 on real world partition member 22. X-ray image 160 shows objects 10, 14 and 15 from a first angle. Objects 10, 14 and 15 are located within interior 13 of enclosed opaque container 12. Object 15 is sitting on top of object 14 as described in the foregoing description and shown in FIG. 1. FIG. 5B shows x-ray image 162 resulting from x-rays passing through second partition member 24 and enclosed opaque container 12. Fiducial markers 60 on second real world partition member 24 were shown as fiducial marker images 164 in x-ray image 162. X-ray image 162 shows objects 10, 14 and 15 from a second angle.

Figure 6:
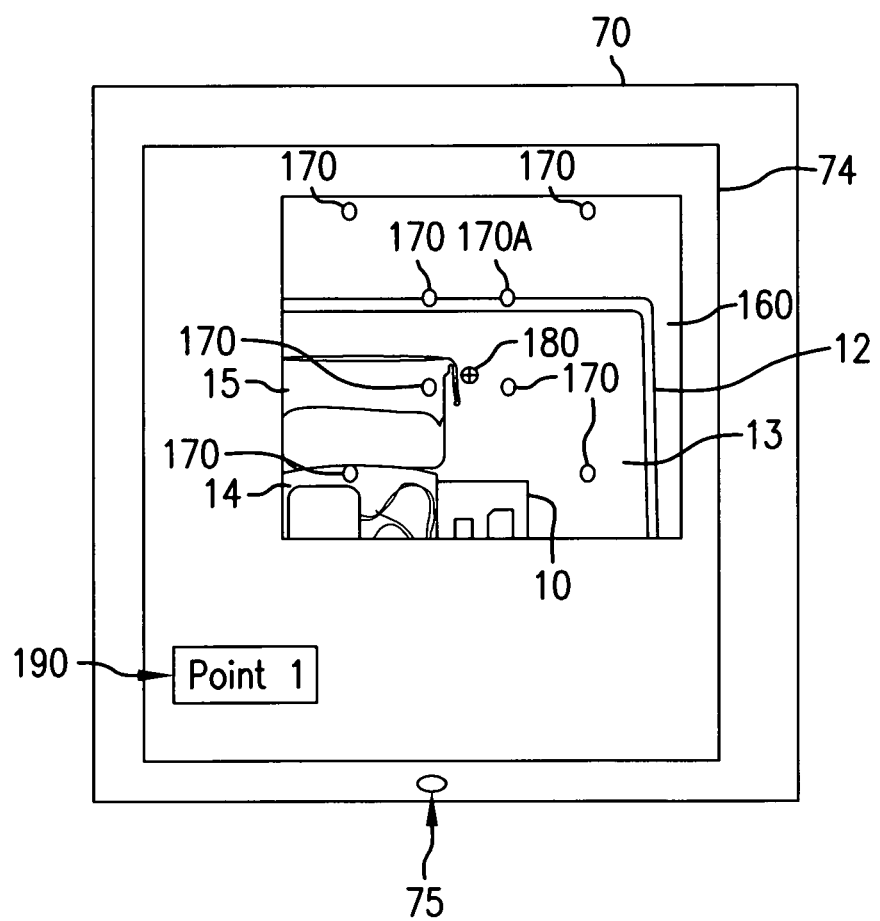
FIG. 6 is a diagram illustrating the x-ray image of FIG. 5A being displayed on a display screen of a smart phone.
Figure 7:
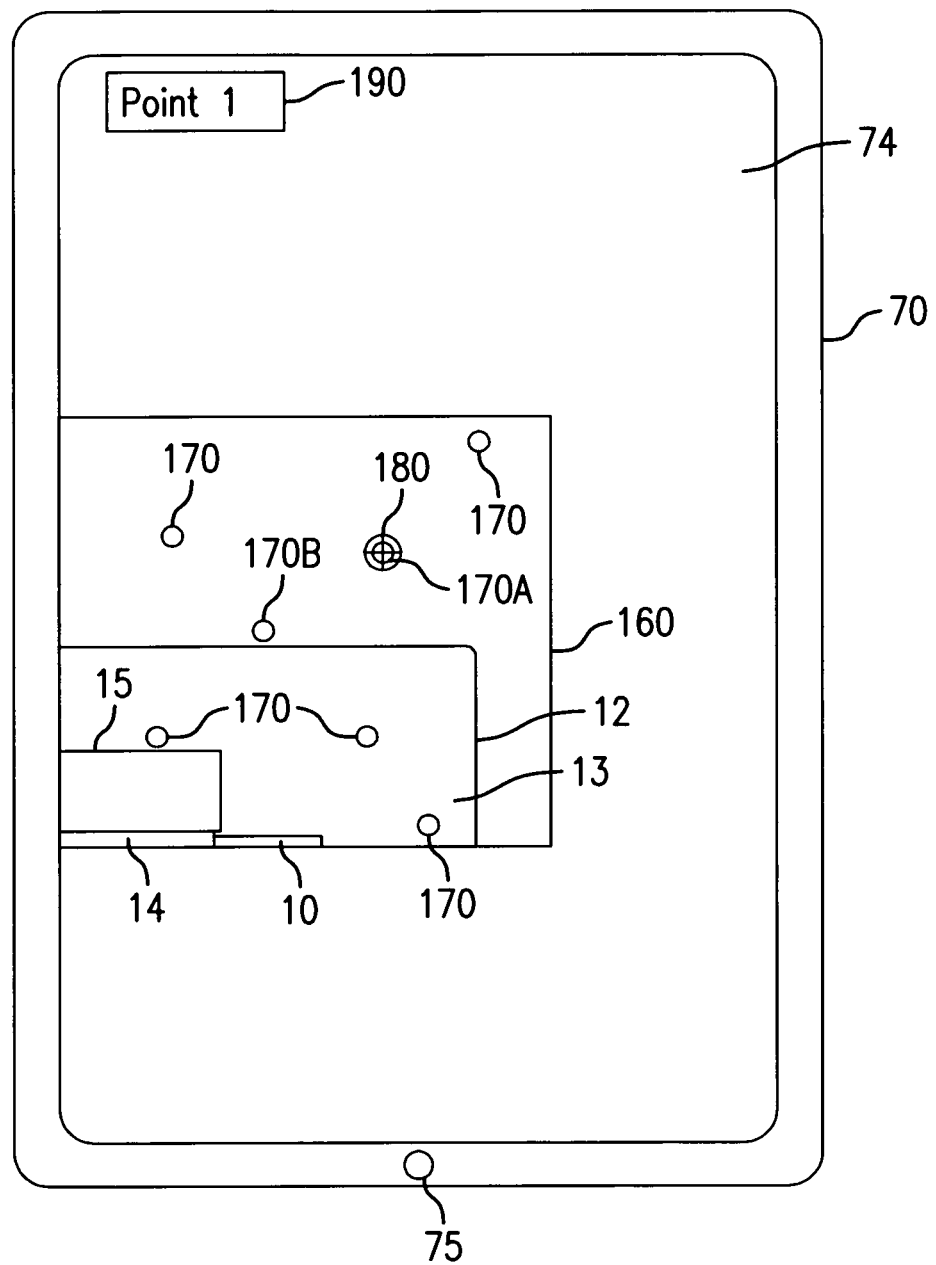
FIG. 7 is a diagram illustrating the x-ray image, shown in FIG. 6, after being dragged to a first location on the display screen so as to map a fiducial marker on the x-ray image with a fiducial marker on the virtual depiction shown in FIG. 4 in order to determine a first point that is to be used in scaling and positioning the x-ray image.
Figure 8:
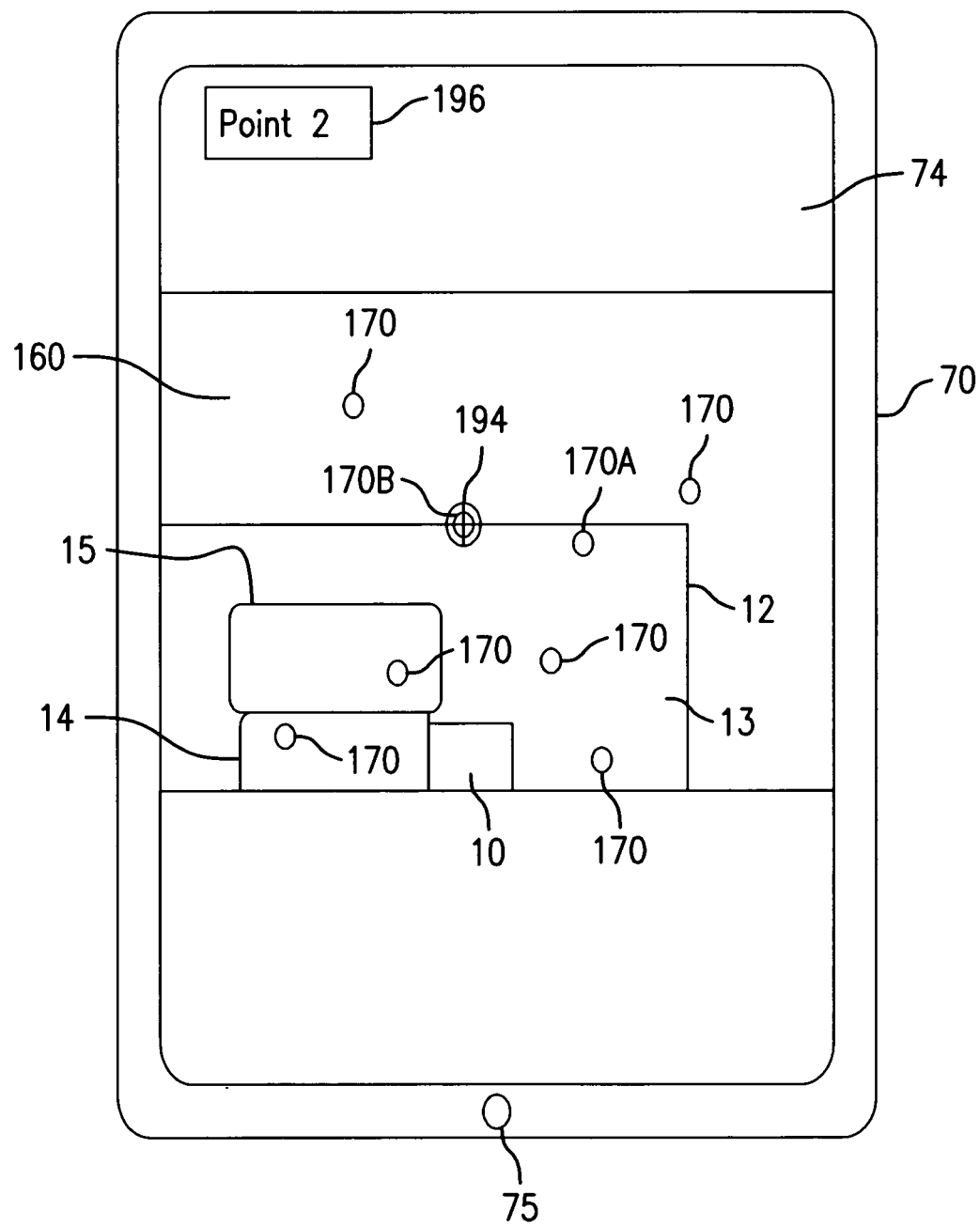
FIG. 8 is a diagram illustrating the x-ray image, shown in FIG. 6, after being dragged to a second location on the display screen so as to map a fiducial marker on the x-ray image with a fiducial marker on the virtual depiction shown in FIG. 4 in order to determine a second point that is to be used in scaling and positioning the x-ray image.

The next step is to scale and position each x-ray image 160 and 162. For purposes of describing this aspect of the invention, x-ray image 160 was scaled and positioned first. Therefore, the first step was to map two of the colored icons 150 shown in virtual depiction 140 (see FIG. 4) with two of corresponding fiducial marker images 170 in corresponding x-ray image 160 (see FIG. 5A). In order to accomplish the mapping step, the user first presses, clicks or touches one of the colored icons 150 in virtual depiction 140. Once one of the colored icons is selected, display screen 74 displays x-ray image 160, a crosshair 180 having the same color as the selected colored icon, and icon 190 labelled "Point 1" as shown in FIG. 6. Crosshair 180 was positioned in the center of display screen 74 and remains stationary in the center of display screen 74. Crosshair 180 is not part of x-ray image 160. For example, referring to FIG. 4, icon 150A is colored blue and corresponds to fiducial marker images 170A shown in FIGS. 5A and 6. If the user touches blue colored icon 150A in FIG. 4, then display element 74 displays x-ray image 160 as shown in FIG. 6 wherein crosshair 180 is colored blue. Then, the user drags x-ray image 160 so that fiducial marker image 170A was aligned with the center of crosshair 180 as shown in FIG. 7. Since the x-ray image 160 was dragged in a downward, diagonal direction (i.e. downward and to the left), portions of objects 10, 14 and 15 are off the display screen 74. The user can enlarge or decrease the size of the view of x-ray image 160 in order to facilitate alignment of fiducial marker image 170A with the center of crosshair 180. When the user believes the alignment is as accurate as possible, the user touches the "Point 1" icon 190. Touching the "Point 1" icon 190 correlates or maps colored icon 150A to fiducial marker image 170A on x-ray image 160. After the user touches the "Point 1" icon 190, display screen 74 once again displays the virtual depiction 140 of the camouflage image 32 with the colored circular icons 150 (see FIG. 4). The user must select another one of the colored icons 150 shown in FIG. 4. However, the user cannot select a colored icon 150 that has the same color as the previously selected colored icon 150A. The user must select a colored icon 150 that has a different color. In this example, the user selects red colored icon 150B shown in FIG. 4 which corresponds to fiducial marker image 170B on x-ray image 160 shown in FIG. 5B. Once the user touches the second colored icon 150B in FIG. 4, display screen 74 shows x-ray image 160, crosshair 194, which is also colored red, and "POINT 2" icon 196. The user then drags x-ray image 160 so as to align corresponding fiducial marker 170B with the center of crosshair 194 as shown in FIG. 8. When the user believes the alignment is as accurate as possible, the user touches icon 196 labelled as "Point 2". Touching the "Point 2" icon 196 correlates or maps colored icon 150B in FIG. 4 to fiducial marker image 170B on x-ray image 160. X-ray image 160 is then automatically scaled, positioned and oriented thereby completing the correlation or mapping process for one of the partition members of frame 20. In an exemplary embodiment, the scaling, positioning orientation of x-ray image 160 takes place in the background while display screen 74 once again displays the virtual depiction 140 of the camouflage image of the selected partition member of frame 20. However, when virtual depiction 140 reappears on display screen 74, colored circular icons 150 were not shown because the mapping process for this selected partition member of frame 20 is now complete. At this time, display screen 74 also displays the menu icon and two icons that allow the user to select either first partition member 22 or second partition member 24. Next, the user will press the icon corresponding to the partition member of frame 20 that was not previously selected so that this partition member can undergo the mapping, scaling and positioning processes as described in the foregoing description. Since x-ray image 160 has now undergone the mapping, scaling and positioning processes, the user will now select second partition member 24 so that x-ray image 162 will undergo the mapping, scaling and positioning steps. However, the user may repeat the process for partition member 22 if the user believes an error was made during the scaling, positioning and orienting processes performed on x-ray image 160.

In some embodiments, the user measures the distance between first partition member 22 and first x-ray film 102 and the distance between second partition member 24 and second x-ray film 124 and then enter those measured distances into the App of smart phone 70. The measurements can be taken manually, via a measuring tape, yard stick, etc.

The next steps of the method of the present invention were referred to as the "Build Mode". In the "Build Mode", x-ray images 160 and 162 are reviewed to find any object in enclosed opaque container 12 that appears suspicious or which warrants further examination. If such a suspicious object is located within enclosed opaque container 12, then the next step is to trace the suspicious object and determine where it is located in 3-D space. For example, if object 10 (see FIG. 1) is the suspicious object, then it is necessary to trace object 10 and determine where it is located in 3-D space. In order to accomplish these steps, the Build Mode utilizes a virtual reality setting. Display screen 74 displays the Menu icon, a second icon labelled "Shapes", a third icon labelled "Functionality" and a fourth icon labelled "Colors". If the "Shape" icon is pressed, then a plurality of icons appear on the screen, wherein each icon indicates a particular geometrical shape, e.g. cuboids, cylinders, spheres, sphero-cylinders, etc. A library of such geometrical shapes or objects is stored in the memory in the smart phone 70. In order to insert a geometrical shape into the x-ray image on display screen 74, the user touches the icon with the desired shape and then drags the shape to a desired location on the x-ray image. Similarly, if the "Functionality" icon is pressed, then a plurality of function icons appears on display screen 74, wherein each icon indicates a particular function. For example, each function icon indicates a particular function such as changing the position, orientation and scale of any of the shapes dragged into the displayed x-ray image. An additional function icon allows the user to delete any of the shapes that have been dragged onto the displayed view of the x-ray image. Since the user can only view one x-ray image at a time, the function icons include a "Change Image" button that allows the user to view the other x-ray image corresponding to the other partition member of frame 20. If the "Colors" icon is touched, then a plurality of icons appears on the display screen, wherein each icon indicates a particular color. The color icons allow the user to colorize any of the shapes that are dragged over the x-ray image. There is no limit on the amount of shapes a user may introduce into the x-ray image displayed by display screen 74. In order for the user to interact with any one shape that has been introduced onto the x-ray image displayed by display screen 74, the user must first select that shape using the appropriate icon. After the user selects that shape, the user can then move, scale, rotate or change the color of the shape. The user can also delete the shape.

Next, the user must trace suspicious object 10 (hereinafter referred to as "target 10"). The user presses the "Shapes" icon and then presses an icon that corresponds to a desired geometrical shape. As a result, the desired geometrical shape appears on display screen 74 and the user then drags the selected geometrical shape over to target 10. The user then attempts to match one of the shapes to an X-Y coordinate of target 10. Using the functionality icons, the user scales, positions or rotates the shapes as needed. Once the user has finished these steps for the first x-ray image (e.g. x-ray image 160), the user then uses the appropriate functionality icon to change the view on display screen 74 to that of the second X-ray image (e.g. x-ray image 162). The user locates target 10 in the second x-ray image and then attempts to match the geometrical shapes to an X-Y coordinate of target 10. Once these steps were completed for the second x-ray image, target 10 can now be located in 3D space in relation to the camouflage images in the virtual environment. As described in the foregoing description, each camouflage image is predefined and its location in the virtual environment was based on a predefined coordinate system. Specifically, the completion of these steps provides 3D vision of frame 20, interior 13 of enclosed opaque container 12 and the location of target 10 with respect to the camouflage images 32 and 40 on real world partition members 22 and 24, respectively. These steps were repeated for other targets of interest that are inside enclosed opaque container 12.

Figure 9:
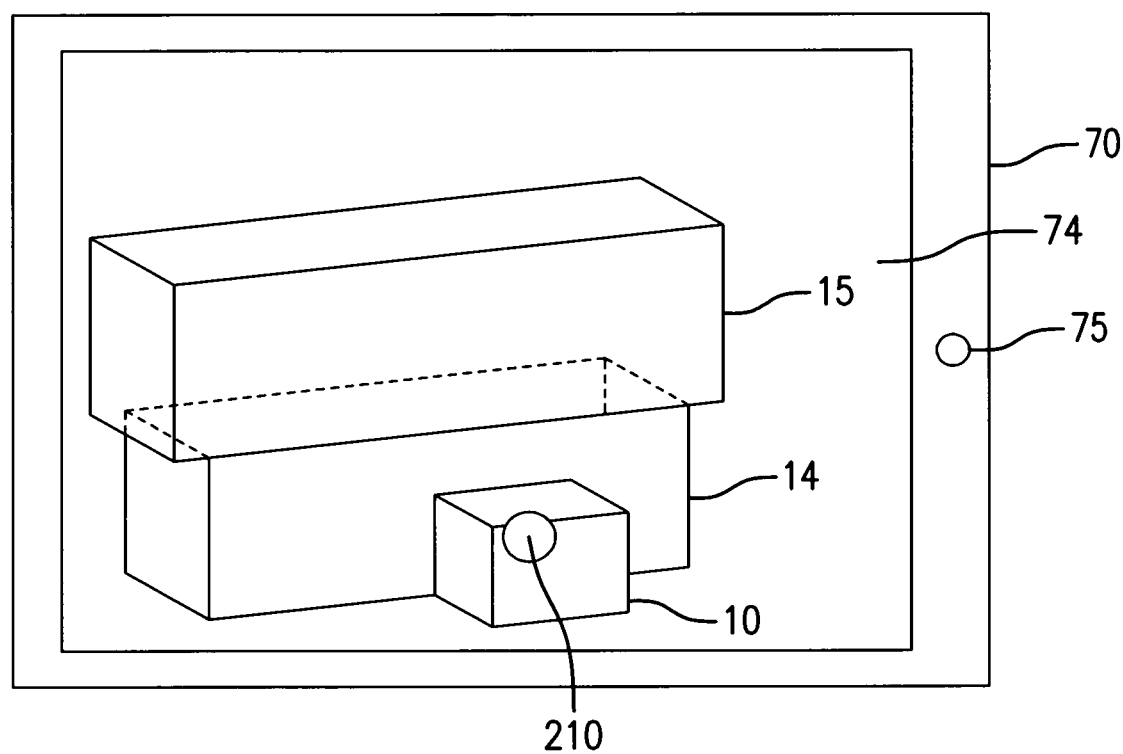
FIG. 9 is illustrates a virtual reality depiction of the interior of the enclosed opaque container being displayed on the display screen of the smart phone, the view showing a sphere positioned at the centroid of an object considered to be a suspicious or threatening object.

Display screen 74 displays the 3D image of the interior of enclosed opaque container 12. The 3D image shows the objects within the interior of enclosed opaque container 12, including target 10. The user then uses his or her finger to touch the image of target 10 shown on display screen 74. Automatically, target 10 was colored with a predetermined color (e.g. green) and the non-selected objects within the interior of enclosed article 12 are colored with different colors. In some embodiments, if any of the non-selected objects are considered a hazard, such objects are colored red, and any object that is neither a target nor a hazard, is colored with a third color, e.g. yellow. The computer program App automatically generates a sphere at the centroid of target 10. This virtual depiction is illustrated in FIG. 9. Display screen 74 displays a virtual reality view through the "virtual camera" showing sphere 210 at the centroid of target 10. In this example, target 10 is colored green, sphere 210 is colored with a different color (e.g. blue), object 15 is colored with red to signify that it is a hazard and object 14 is colored yellow to signify that it is neither a hazard nor a target. The purpose of sphere 210 is to provide a visual aid when aiming disrupter device 200 at target 10 during the Aim Mode, which is described in the ensuing description.

Disrupter device 200 was configured to propel or fire a substance or projectile at target 10 in order to destroy or disable target 10 while avoiding other objects in enclosed opaque container 12 such as objects 14 and 15. Disrupter device 200 may fire or propel such projectiles or substances. Such projectiles and substances include projectiles made from metal or other materials, cartridges that explode upon impact and pressurized fluids such as water. As shown, in FIG. 1, disrupter device 200 is aimed at target 10 based on the information and data obtained by the steps described herein. Disrupter device 200 includes laser boresighter 204 (shown in phantom) that generates laser beam 206. In an exemplary embodiment, laser boresighter 204 was inserted or positioned within a bore of disrupter device 200. In an exemplary embodiment, smart phone 70 also was mounted to support structure 80 and is located adjacent to disrupter device 200. In actuality, disrupter device 200 is positioned a safe distance away from enclosed opaque container 12. In another exemplary embodiment, the process of determining orthogonality, as described in the foregoing description, may be implemented into order to find orthogonality between the flight path of a projectile that is to be fired by disrupter device 200 and target 10. In such an embodiment, the determination of orthogonality prevents the projectile from ricocheting inside enclosed opaque container 12.

The user now refers to the Menu wherein all of the Modes are listed. The two remaining modes are Calibration Mode and Aim Mode. In some embodiments, the Calibration Mode was implemented prior to finding orthogonality. As described in the foregoing description, the process of finding orthogonality is done prior to taking x-rays. In some embodiments, the Calibration Mode was implemented prior to the Aim Mode. For example, if Calibration Mode was previously implemented to calibrate the software (e.g. smart phone App) based on the location of x-ray machine 100 but x-ray machine 100 was subsequently replaced with disrupter device 200, then Calibration Mode may have to be implemented again because the location from where the x-ray beam was emitted may be different than the location from where the projectile is fired.

As shown in FIG. 10, each partition member 22 and 24 of frame 20 has a center point represented by a small circle and a cross-hair symbol superimposed over the small circle. The intersection of the two lines that form the cross-hair defines the center point of the partition member. The center point of the partition member is also the center of the corresponding camouflage image on the partition member. For example, first partition member 22 has center point 220 defined by a circle crosshair symbol. Center point 220 functions as a known location on first partition member 22 to which the user can direct laser beam 206. Similarly, second partition member 24 has center point 230, which is defined by another circle and crosshair symbol. Center point 230 has the same function as center point 220 of first partition member 22. The software App executed by smart phone 70 knows where center points 220 and 230 are located because camouflage images 32 and 40 are predefined and recognizable by the ACV software executed by the processing element of smart phone 70. Thus, center points 220 and 230 are represented by corresponding symbols on the virtual depictions of the camouflage images. For example, crosshair symbol 220 was represented as center point 240 in the virtual depiction shown in FIG. 4.

When Calibration Mode is selected, a "Live Feed" seen by camera 72 of smart phone 70 is displayed on display screen 74. The Calibration Mode determines two points in space, Point 1 and Point 2, that are defined by (X, Y, Z) coordinates and which define a virtual line. This virtual line defines an aiming vector used in the Aim Mode, which is described in the ensuing description. In order to define the two points in space, two (X, Y, Z) coordinate frames are used. One (X, Y, Z) coordinate frame is moving (X, Y, Z) coordinate frame 270, the origin of which being the center of the lens of camera 72. The other (X, Y, Z) coordinate frame is static (X, Y, Z) coordinate frame 272, the origin of which is at bottom corner the selected partition member. For example, in FIG. 10A, static (X, Y, Z) coordinate frame 272 is at bottom corner of 274 of partition member 22. The two (X, Y, Z) coordinates that define the virtual line belong directly to moving (X, Y, Z) coordinate frame 270 because these two (X, Y, Z) coordinates are fixed with respect to camera 72 and will go wherever camera 72 goes. Stated another way, after the Calibration Mode, the virtual line or aiming vector, which is represented by the two (X, Y, Z) coordinates in the moving (X, Y, Z) coordinate frame 270, moves with camera 72 wherever camera 72 goes. The virtual line or aiming vector was not fixed to center point 220 on first real world partition member 22.

Figure 10A:
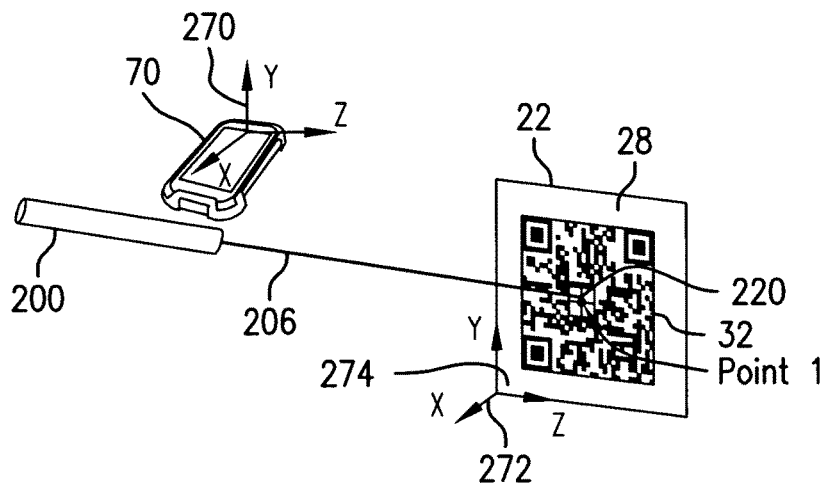
FIG. 10A is a diagram illustrating a first step in a calibration mode for determining a first point on a virtual line.
Figure 10B:
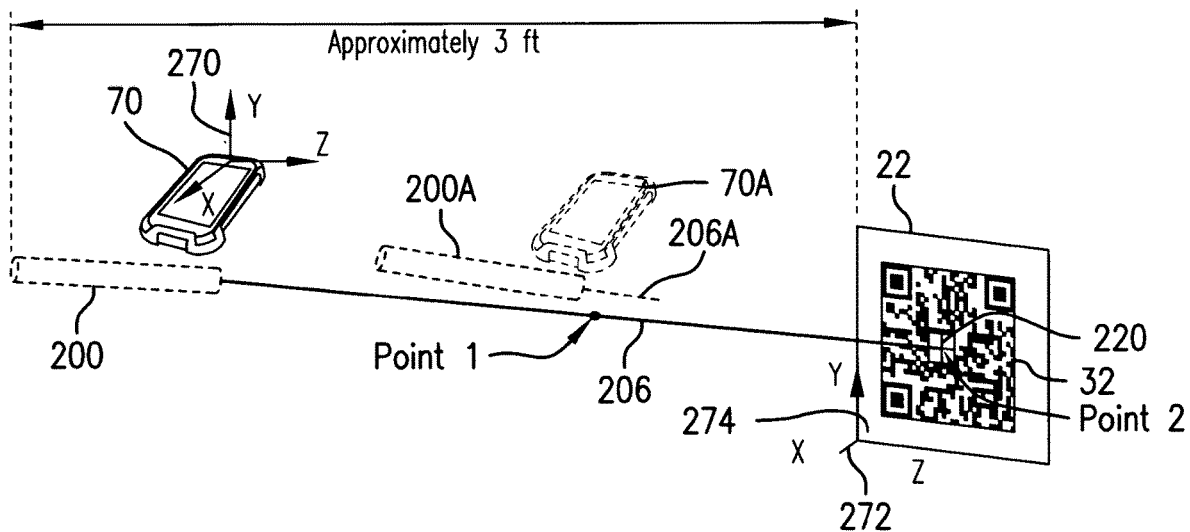
FIG. 10B is a diagram illustrating a second step in the calibration mode for determining a second point on the virtual line.

Referring to FIG. 10A, the first step in the Calibration Mode is to select either camouflage image 32 or camouflage 40. The user must use the same camouflage image in the determination of both (X, Y, Z) coordinates. For purposes of describing this aspect of the invention, the ensuing description is in terms of the user selecting camouflage image 32 on first partition member 22. Display screen 74 displays an icon labelled "Point 1". Point 1 is the first point on the virtual line that will be determined in the Calibration Mode. Support structure 80, with smart phone 70 and disrupter device 200 attached thereto, is first positioned at a first location with respect to first partition member 22. Point 1 is located at the center point 220 of first partition member 22. The user aligns disrupter device 200 so that laser beam 206 is aligned with center point 220 on first partition member 22. When the alignment is complete, the user touches the "Point 1" icon. As a result, Point 1 is recorded relative to moving (X, Y, Z) coordinate frame 270. As stated in the foregoing description, moving (X, Y, Z) coordinate frame 270 moves with camera 72. The 3D camera is now aware of the location of Point 1 relative to camera 72. After Point 1 is recorded, display screen 74 displays an icon labelled "Point 2". Point 2 is the second point on the virtual line that will be determined in the Calibration Mode. Point 2 is the second point in space, which is farther away from the camera's moving (X, Y, Z) coordinate frame 270 than Point 1. Although frame 20 cannot be physically moved at this time, Point 2 can still be determined by moving camera 72 and disrupter device 200 backward from first partition member 22. This is illustrated by the diagram in FIG. 10B. Support structure 80, with smart phone 70 and disrupter device 200 attached thereto, is moved back a distance from first partition member 22 and positioned at a second location with respect to first partition member 22. The distance disrupter device 200 is moved back can be just a few inches or several feet. In this example, disrupter device 200 is move backward approximately three feet from the corner of first partition member 22. The previous positions of smart phone 70 and disrupter device 200 are represented in phantom and indicated by reference numbers 70A and 200A, respectively, shown in FIG. 10B. The previous path of laser beam 206, shown in FIG. 10A, is now represented by the dashed line 206A in FIG. 10B. In this step, Point 2 is located at center point 220 of first partition member 22 and Point 1 is now located at the point in space that corresponds to the previous location of the forward end of the barrel of disrupter device 200 (see FIG.

10A). Disrupter device 200 is adjusted again so that laser beam 206 is aligned with center point 220 on first partition member 22. When the alignment is complete, the user touches the "Point 2" icon. As a result, Point 2 is recorded relative to moving (X, Y, Z) coordinate frame 270. As stated in the foregoing description, moving (X, Y, Z) coordinate frame 270 moves with camera 72. The 3D camera is now aware of the location of Point 2 relative to camera 72. After these aforementioned steps are completed, the 3D camera is now aware of the location of both Point 1 and Point 2 relative to moving (X, Y, Z) coordinate frame 270. The software App executed by the processing element of smart phone 70 now generates a virtual line between Point 1 and Point 2 and records the position and orientation of this virtual line. This virtual line is equal to the longitudinally extending axis of the bore or barrel of disrupter 200 in position and orientation and is used as the aiming vector in the Aim Mode, which is described in the ensuing description. The Calibration Mode is now complete.

Figure 11:
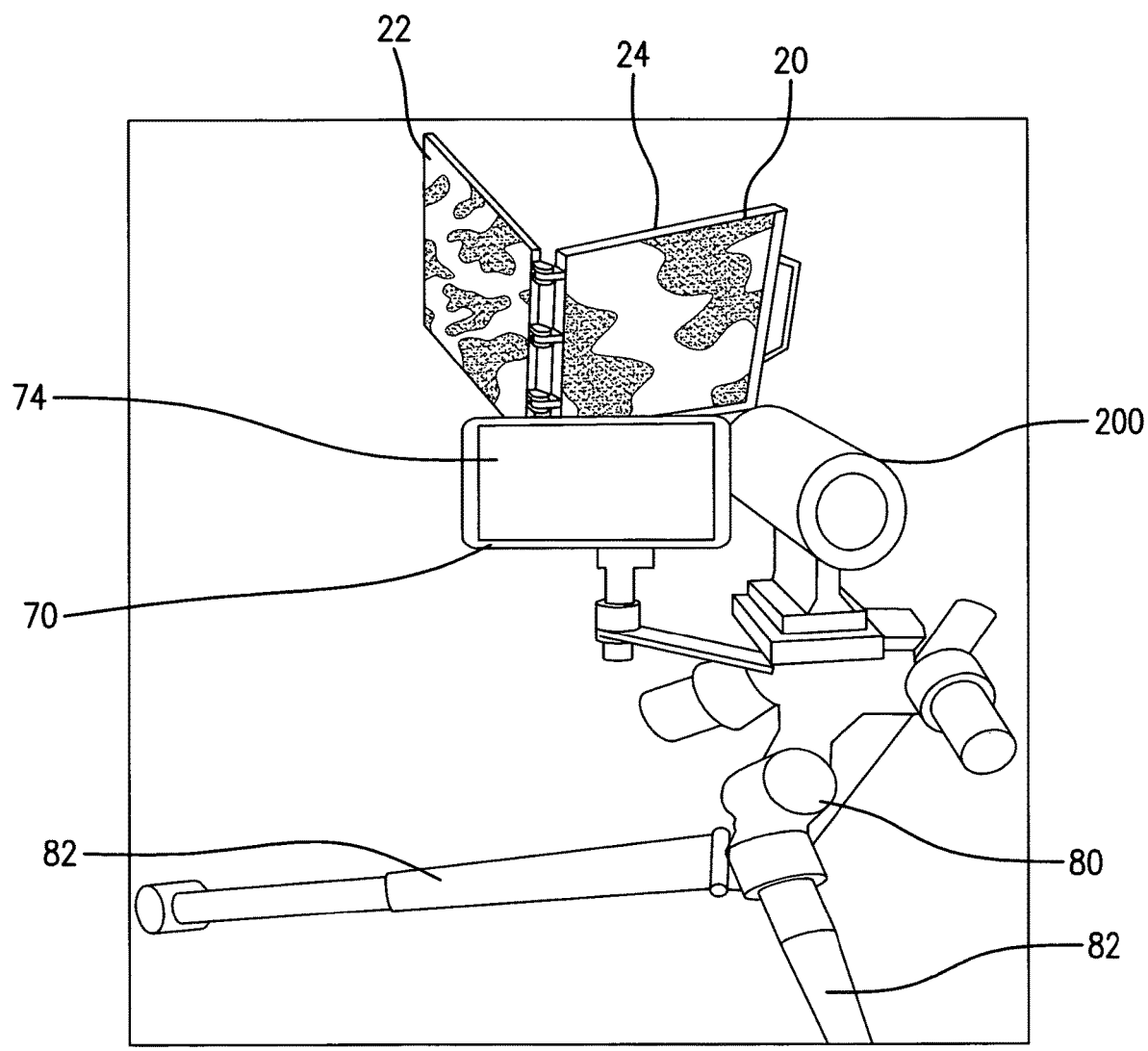
FIG. 11 is a perspective view showing the location of a disrupter device and smart phone camera with respect to the collapsible frame and enclosed opaque container, the display screen of the smart phone camera displaying a virtual reality depiction of the interior of the enclosed opaque container, the display screen displaying a crosshair symbol that is aligned with the centroid of the suspicious or threatening object shown in FIG. 9.
Figure 12:
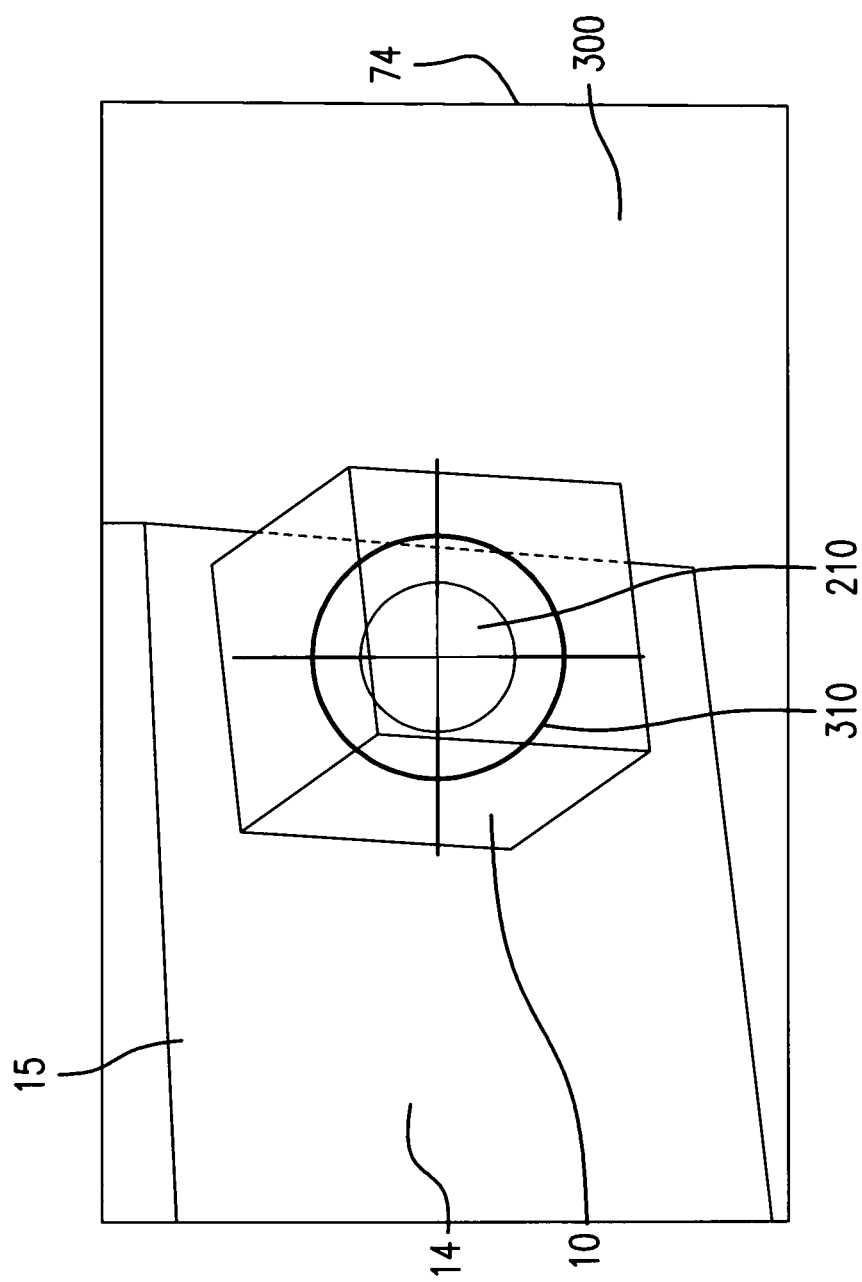
FIG. 12 is an enlarged version of the view that is displayed on the display screen in FIG. 11.

After the Calibration Mode was completed, the Aim Mode automatically begins. Referring to FIGS. 11 and 12, there is shown smart phone 70 and disrupter device 200 mounted to support structure 80. Laser boresighter 204 is within the bore of disrupter device 200 (see FIG. 1) and emits laser beam 206 (see FIGS. 1, 10A and 10B). The view displayed on display screen 74 is that of a virtual reality (VR) view 300 (see FIG. 12) that is based on the virtual items that were created in the Build Mode and based on the real world items shown in x-ray image 160 and x-ray image 162. Virtual reality view 300 shows target 10, hazardous object 15 that is to be avoided and neutral object 14 that is neither a target nor a hazardous item. Therefore, display screen 74 displays a view of a "virtual camera". The virtual reality (VR) view 300, which is to be displayed on display screen 74, is shown in FIG. 12. The view in FIG. 12 shows objects 10, 14 and 15 and sphere 210 which are all shown in the view shown in FIG. 9. In FIG. 12, display screen 74 now displays crosshairs 310 that are located in the center of display screen 74 and are stationary. Crosshairs 310 provide a reference to the center of display screen 74. Specifically, the crosshairs 310 coincides with the virtual aiming vector that was calibrated in the Calibration Mode. Aligning the crosshairs 310 with target 10 actually aligns the center of display screen 74 with target 10 and therefore the aiming vector. Therefore, the "virtual camera" was aligned with the aiming vector calibrated in the Calibration Mode so that when target 10 is within crosshairs 310, it actually means that disrupter device 200 is aimed at target 10. Hence, the view through the virtual camera is actually the view seen looking from the "bore" or "barrel" of disrupter device 200. As a result, the user need only move camera 72 and point it at target 10, similar to taking a photograph, so that target 10 was aligned with crosshairs 310.

Figure 13:
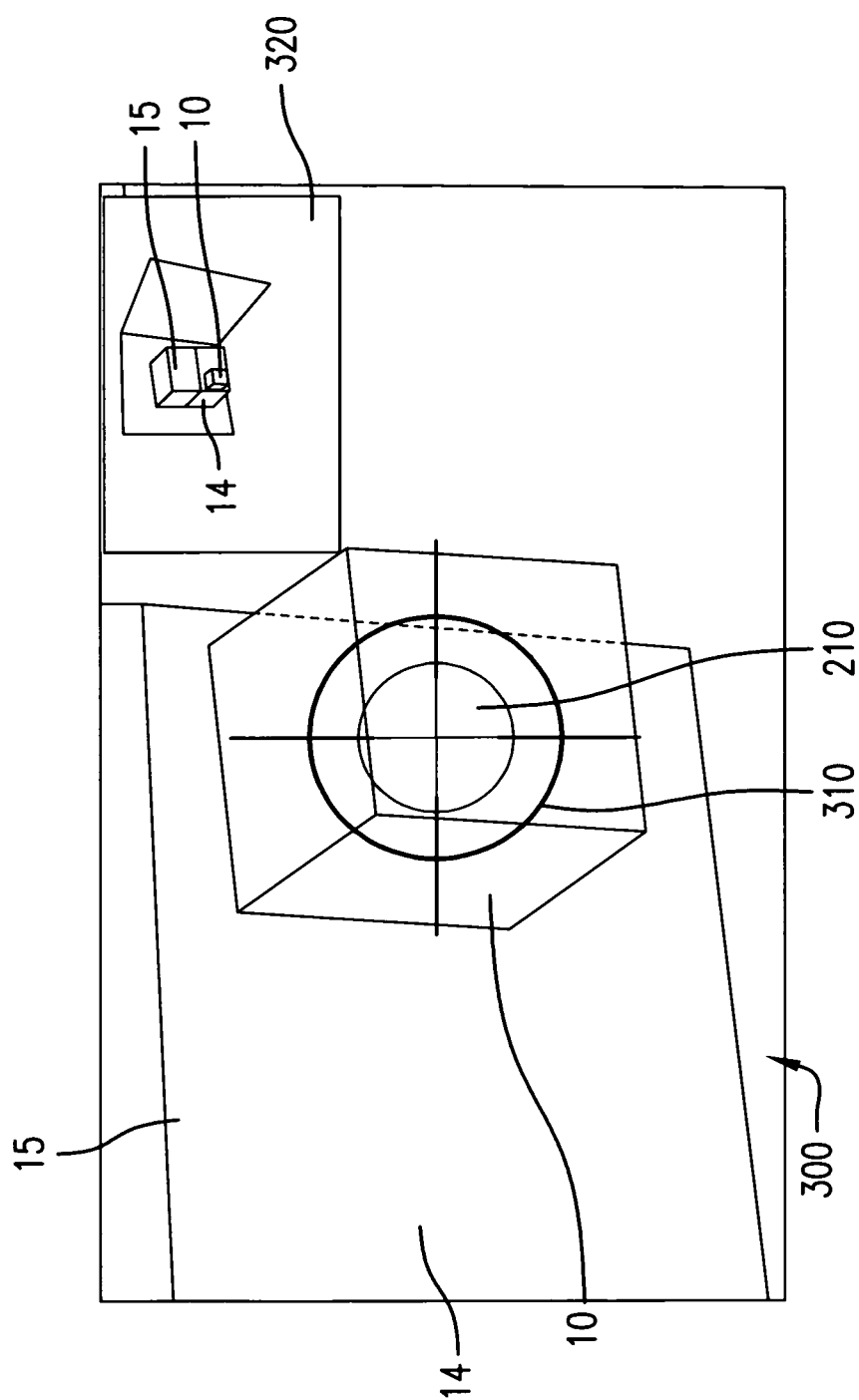
FIG. 13 is a view displayed by the display screen in FIG. 11 which includes both a virtual reality view and an augmented reality view of the interior of the enclosed opaque container in accordance with another exemplary embodiment of the present invention.

Referring to FIG. 13, in some embodiments of the Aim Mode, display screen 74 also displays a live-feed augmented reality (AR) view 320 in the corner of display screen 74 while simultaneously displaying view 300. Augmented reality view 320 provides the user with a view of what the aiming vector looks like from the camera standpoint. Specifically, augmented reality view 320 shows target 10, hazardous object 15 and neutral object 14, all of which being positioned within enclosed opaque container 12. In other embodiments of the Aim Mode, the augmented reality view 320 was used for calibration monitoring. Such calibration monitoring includes aligning the elements in the augmented reality (AR) view to reference features on frame 20 in order to ensure the alignment of the augmented reality view is correct. This calibration monitoring procedure includes inspecting the augmented reality view right before disrupter device 200 fires the projectile.

Next, frame 20 was removed so that there are no items or objects between disrupter device 200 and enclosed opaque container 12. Laser boresighter 204 was removed from the bore or barrel of disrupter device 200 and is replaced by the projectile that is to be fired at target 10. The user then fires disrupter device 200 such that the projectile travels along the aiming vector and impacts target 10 at the point defined by crosshairs 310 thereby destroying or disabling target 10.

The foregoing description, for purpose of explanation, has been described with reference to specific exemplary embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method for determining the location in 3D space of an object within an interior of an enclosed, opaque container, comprising:

providing a first real world partition member having a surface with a first predefined unique image thereon and a second real world partition member having a surface with a second predefined unique image thereon, wherein each of the first real world partition member and the second real world partition member is fabricated from a low density material and includes a plurality of fiducial markers;

positioning the first real world partition member for facing one side of the container and positioning the second real world partition member for facing another side of the container;

providing a first data set for defining a first predefined unique image and a second data set for defining a second predefined unique image;

providing an image capturing device, a display element, at least one memory medium and a processing element being in electronic signal communication with the image capturing device, the display element and at least one memory medium, wherein the processing element is programmed with the first data set and the second data set and wherein the processing element is programmed to generate a graphical user interface for display on the display element;

capturing, by the image capturing device, the first predefined unique image on the first real world partition member and the second predefined unique image on the second real world partition member;

processing, by the processing element, the captured first predefined unique image and second predefined unique image for generating a virtual reality environment that includes virtual depictions of the first real world partition member with the first predefined unique image thereon and the second real world partition member with the second predefined unique image thereon;
generating x-ray radiation for penetrating the first real world partition member and the enclosed, opaque container for producing a first x-ray image corresponding to the first real world partition member and which shows the fiducial markers of the first real world partition member and a view of the interior of the enclosed, opaque container from a first angle;
generating x-ray radiation penetrating the second real world partition member and the enclosed, opaque container for producing a second x-ray image corresponding to the second real world partition member and which shows the fiducial markers of the second real world partition member and a view of the interior of the enclosed, opaque container from a second angle;
digitizing the first x-ray image and the second x-ray image for producing a first digital x-ray image and a second digital x-ray image;
importing the first digital x-ray image and the second digital x-ray image into the memory medium,
wherein the method includes, for each of the real world partition members and corresponding one of said first digital x-ray image and said second digital x-ray image:
displaying, by the display element, the virtual depiction of the predefined unique image and fiducial markers of the real world partition member, the fiducial markers are shown as a plurality of icons in the virtual depiction, wherein each icon is differentiated from the other icons, and wherein the location of each icon corresponds to a location of a corresponding fiducial marker on the real world partition member;
selecting, by the graphical user interface, a first icon on the virtual depiction of the first real world partition member;
mapping the selected first icon with a corresponding fiducial marker shown in the first digital x-ray image corresponding to the first real world partition member so as to define a first point;
selecting a second icon on the virtual depiction of the second real world partition member;
mapping the selected second icon with a corresponding fiducial marker shown in the second digital x-ray image corresponding to the second real world partition member so as to define a second point;
scaling, positioning and orienting the first digital x-ray image and the second digital x-ray image corresponding to the first real world partition member and the second real world partition member based on the mapping of the selected first icon and the selected second icon with the respective corresponding fiducial markers shown in respective said first digital x-ray image that corresponds to the first real world partition member and respective said second digital x-ray image that corresponds to the second real world petition member; and
reviewing the scaled, positioned and oriented the first digital x-ray image and the second digital x-ray image for determining whether an object of interest exists inside the enclosed article, wherein for said object of interest, the method includes, for each scaled, positioned and oriented said first digital x-ray image and said second digital x-ray image:
displaying, by the display element, the scaled, positioned and oriented said first digital x-ray image and second digital x-ray image and the virtual depiction of the predefined image of respective the first real world partition member and the second real world partition member, which corresponds to the scaled, positioned and oriented respective said first digital x-ray image and said second digital x-ray image;
selecting a reference geometrical shape from a plurality of reference geometrical shapes and dragging the selected reference geometrical shape over the scaled, positioned and oriented respective said first digital x-ray image and said second digital x-ray image; and
matching the selected reference geometrical shape to an X-Y coordinate of the object of interest shown in the scaled, positioned and oriented respective said first digital x-ray image and said second digital x-ray image so as to determine a location of the object of interest in 3D space in relation to the virtual depiction of the predefined images on the first real world partition members and the second real world partition member.

2. The method according to claim 1, further comprising providing a disrupter device including a longitudinally extending axis and being configured for firing a projectile at the object of interest for one of disabling and destroying the object of interest, wherein the disrupter device includes a laser boresighter to generate a laser beam that is coaxial with the longitudinally extending axis, and wherein the image capturing device is attached to the disrupter device such that the image capturing device moves with the disrupter device.

3. The method according to claim 2, further comprising generating a virtual line extending from the barrel of the disrupter device to the object of interest, wherein the virtual line defines an aiming vector.

4. The method according to claim 2, further comprising generating a virtual line extending from the barrel of the disrupter device to the object of interest, wherein the virtual line defines an aiming vector, wherein the image capturing device comprises a camera including a camera lens, wherein the camera lens has a center that defines a moving (X, Y, Z) coordinate frame, wherein generating the virtual line comprises:
selecting one of the first real world partition members and the second real world partition member of the frame, wherein one of the selected first real world partition member and the second real world partition member includes a center point and a bottom corner, and wherein the bottom corner defines a static (X, Y, Z) coordinate frame;
positioning the disrupter device at a first distance from the center point of the selected one of the first real world partition member and the second real world partition member;
aligning the laser beam of the laser boresighter with the center point of the selected one of the first real world partition member and the second real world partition member;
recording, by the processing element, a first point in space relative to the moving (X, Y, Z) coordinate frame, wherein the first point is at the center point of the selected one of the first real world partition member and the second real world partition member;
re-positioning the disrupter device and camera at a second distance from the center point of the selected one of the first real world partition member and the second real world partition member, wherein the second distance is greater than the first distance and wherein the first point in space is now space apart from the center point of the selected one of the first real world partition member and the second real world partition member by the second distance;

aligning the laser beam of the laser boresighter with the center point of the selected one of the first real world partition member and the second real world partition member;

recording, by the processing element, a second point in space relative to the moving (X, Y, Z) coordinate frame, wherein the second point is now at the center point of the selected one of the first real world partition member and the second real world partition member;

generating, by the processing element, a virtual line between the first point and the second point; and recording, by the processing element, the position and orientation of this virtual line.

5. The method according to claim 2, further comprising generating a virtual line extending from the barrel of the disrupter device to the object of interest, wherein the virtual line defines an aiming vector 3;

removing the first real world partition member and the second real world partition member; and firing, using the disrupter device, a projectile at the target of interest, wherein the projectile travels along the aiming vector.

6. The method according to claim 1, wherein the fiducial markers on the first real world partition member are arranged in a first predetermined pattern and the fiducial markers on the second real world partition member are arranged in a second predetermined pattern.

7. The method according to claim 6, wherein the first predetermined pattern is substantially the same as the second predetermined pattern.

8. The method according to claim 1, wherein the each fiducial marker is a tungsten disc-shaped fiducial marker.

9. The method according to claim 1, further comprising determining orthogonality of the x-ray radiation with respect to the first real world partition member; and determining orthogonality of the x-ray radiation respect to the second real world partition member.

10. The method according to claim 1, wherein the each icon in the virtual depiction of the predefined unique image and fiducial markers of the real world partition member is a different color.

11. The method according to claim 1, further comprising generating a virtual depiction of the objects being inside the enclosed opaque article, wherein the object of interest is colorized with a first color, wherein a hazardous object is colorized with a second color, and wherein a third object, which is neither of interest nor hazardous, are colorized with a third color.

12. The method according to claim 1, wherein the first real world partition member and the second real world partition member are pivotally attached to each other such that first real world partition member is pivotable with respect to the second real world partition member, wherein both the first and second real world partition members form an adjustable frame, and wherein each of the first real world partition member and the second real world partition members defines a plane.

13. The method according to claim 12, wherein the adjustable frame is configured so that the plane of said first real world partition member is substantially perpendicular to the second real world partition member.

14. The method according to claim 1, wherein said generating x-ray radiation to penetrate the first real world partition member comprises provides an x-ray generating device; and positions the x-ray generating device so that the first real world partition member is situated between the x-ray generating device and the enclosed opaque article.

15. The method according to claim 1, wherein said generating x-ray radiation that penetrates the second real world partition member comprises:

providing an x-ray generating device; and positioning the x-ray generating device so that the second real world partition member is between the x-ray generating device and the enclosed opaque article.

16. The method according to claim 1, wherein generating x-ray radiation to penetrate the first real world partition member comprises provides a first x-ray film, and positions the first x-ray film such that the enclosed opaque article is situated between the first real world partition member and the first x-ray film so that the first x-ray image is formed on the first x-ray film; and wherein said generating x-ray radiation penetrates the second real world partition member comprises:

providing a second x-ray film; and positioning the second x-ray film such that the enclosed opaque article is between the second real world partition member and the second x-ray film so that the second x-ray image is formed on the first x-ray film.

17. The method according to claim 16, wherein said digitizing the first x-ray image and the second x-ray image comprises digitally scanning the first x-ray film having the first x-ray image formed thereon and digitally scanning the second x-ray film having the second x-ray image formed thereon.

18. The method according to claim 1, further comprising determining, by the processing element, a centroid of the object of interest;

generating, by the processing element, indicia at the centroid of the object of interest; and displaying, by the display element, the indicia at the centroid of the object of interest.

19. The method according to claim 18, wherein the indicia comprises a geometrical shape.

20. A system for determining the location in 3D space of an object within an interior of an enclosed, opaque container, comprising:

a first real world partition member having a surface with a first predefined unique image thereon, the first real world partition member positioned so as to face one side of the enclosed opaque container;

a second real world partition member having a surface with a second predefined unique image thereon, the second real world partition member positioned so as to face another side of the enclosed opaque container, wherein each of the first real world partition member and the second real world member is fabricated from a low density material and includes a plurality of fiducial markers;

an apparatus for generating a first x-ray radiation for penetrating the first real world partition member and the enclosed, opaque container for producing a first x-ray image corresponding to the first real world partition member and which shows the fiducial markers of the first real world partition member and a view of the interior of the enclosed, opaque container from a first angle; and for generating a second x-ray radiation for penetrating the second real world partition member and the enclosed, opaque container for producing a second x-ray image corresponding to the second real world partition member and which shows the fiducial markers of the second real world partition member and a view of the interior of the enclosed, opaque container from a second angle;

a device for digitizing the first x-ray image and the second x-ray image for respectively producing a first digital x-ray image and a second digital x-ray image;

an image capturing device being configured for capturing a selected one of said first digital x-ray image and the second digital x-ray image, and providing the said selected one of said first digital x-ray image and the second digital x-ray image, which is captured in digital form;

a display element;

at least one processor being in electronic data signal communication with the image capturing device and the display element;

at least one memory being in electronic data signal communication with the at least one processor and said at least one memory comprising data storage resource for storing a first data set for defining a first predefined unique image and a second data set that defines a second predefined unique image, wherein the at least one memory further comprising computer readable code executable by the at least one processors to:

generate a graphical user interface for display on the display element;

capture, by the image capturing device, the first predefined unique image on the first real world partition member and the second predefined unique image on the second real world partition member;

process, by the processing element, the captured first predefined unique image and second predefined unique image to generate a virtual reality environment that includes virtual depictions of the first real world partition member with the first predefined unique image thereon and the second real world partition member with the second predefined unique image thereon; and import the first digital x-ray image and the second digital x-ray image into the at least one memory medium;

wherein for each of the first real world partition member and the second real world partition members and corresponding one of said first digital x-ray image and said second digital x-ray image:

display, by the display element, the virtual depiction of the predefined unique image and fiducial markers of respective one of the first real world partition member and the second real world partition member, the fiducial markers shown as a plurality of icons in the virtual depiction, wherein each icon is differentiated from the other icons and wherein the location of each icon corresponds to a location of a corresponding fiducial marker on respective the first real world partition member and the second real world partition member;

allow a user to select, using the graphical user interface, a first icon on the virtual depiction of selected one of the first real world partition member and the second real world partition member;

allow a user to map, using the graphical user interface, the selected first icon with a corresponding fiducial marker shown in the first digital x-ray image corresponding to selected one of the first real world partition member and the second real world partition member so as to define a first point;

allow a user to select, using the graphical user interface, a second icon on the virtual depiction of selected one of the first real world partition member and the second real world partition member;

allow a user to map, using the graphical user interface, the selected second icon with a corresponding fiducial marker shown in the second digital x-ray image corresponding to respective one of the first real world partition member and the second real world partition member so as to define a second point; and scale, position and orient the first digital x-ray image corresponding to respective one of the first real world partition member and the second real world partition member based on the mapping of the selected first icon and the selected second icon with the respective corresponding fiducial markers shown in the second digital x-ray image that corresponds to respective one of the first real world partition member and the second real world partition member;

allow the user to review, using the display element, the scaled, positioned and oriented said first digital x-ray images and said second digital x-ray image to determine if there is an object of interest inside the enclosed opaque article;

for each scaled, positioned and oriented said first digital x-ray image and said second digital x-ray image:

display, by the display element, the scaled, positioned and oriented selected said first digital x-ray image and said second digital x-ray image and the virtual depiction of the predefined image of the first real world partition member and the second real world partition member that corresponds to the scaled, positioned and oriented selected said first digital x-ray image and said second digital x-ray image;

allow a user to select, by the graphical user interface, a reference geometrical shape from a plurality of reference geometrical shapes and drag the selected reference geometrical shape over the scaled, positioned and oriented said selected said first digital x-ray image and said second digital x-ray image; and allow a user to match, using the graphical user interface, the selected reference geometrical shape to an X-Y coordinate of the object of interest shown in the scaled, positioned and oriented selected said first digital x-ray image and said second digital x-ray image so as to determine a location of the object of interest in 3D space in relation to the virtual depiction of the predefined images on the first real world partition member and the second real world partition members.

21. The system according to claim 20, further comprising a disrupter device including a longitudinally extending axis and being configured for firing a projectile at the object of interest in order to disable or destroy the object of interest, wherein the disrupter device includes a laser boresighter to generate a laser beam that is coaxial with the longitudinally extending axis, and wherein the image capturing device is attached to the disrupter device such that the image capturing device moves with the disrupter device.

22. The system according to claim 21, wherein the at least one memory further comprises computer readable code to generate a virtual line that extends from the barrel of the disrupter device to the object of interest, and wherein the virtual line defines an aiming vector.

23. The system according to claim 21, wherein the at least one memory further comprises computer readable code to generate a virtual line that extends from the barrel of the disrupter device to the object of interest, wherein the virtual line defines an aiming vector, wherein the image capturing device comprises a camera having a camera lens, wherein the camera lens includes a center that defines a moving (X, Y, Z) coordinate frame, and wherein the computer readable code that generates the virtual line comprises computer readable code to:
   prompt the user to select, by the graphical user interface, one of the first real world partition members and the second real world partition member of the frame, the selected said one of the first real world partition member and the second real world partition member having a center point and a bottom corner, wherein the bottom corner defines a static (X, Y, Z) coordinate frame;
   prompt the user to position the disrupter device at a first distance from the center point of the selected said one of the first real world partition member and the second real world partition member;
   prompt the user to align the laser beam of the laser boresighter with the center point of the selected said one of the first real world partition member and the second real world partition member;
   record, by the at least processor, a first point in space relative to the moving (X, Y, Z) coordinate frame, wherein the first point is at the center point of the selected said one of the first real world partition member and the second real world partition member;
   prompt the user to re-position the disrupter device and camera at a second distance from the center point of the selected said one of the first real world partition member and the second real world partition member, wherein the second distance is greater than the first distance and wherein the first point in space is now spaced apart from the center point of the said one of the first real world partition member and the second real world partition member by the second distance;
   prompt the user to align the laser beam of the laser boresighter with the center point of the selected said one of the first real world partition member and the second real world partition member;
   record, by the at least one processor, a second point in space relative to the moving (X, Y, Z) coordinate frame, wherein the second point is now at the center point of the selected said one of the first real world partition member and the second real world partition member;
   generate, by the processing element, a virtual line between the first point and the second point; and
   record, by the at least one processor, the position and orientation of this virtual line.

24. The system according to claim 21, further comprising a disrupter device including a longitudinally extending axis and being configured for firing a projectile at the object of interest in order to one of disable and destroy the object of interest, wherein the disrupter device includes a laser boresighter to generate a laser beam that is coaxial with the longitudinally extending axis, wherein the image capturing device is attached to the disrupter device such that the image capturing device moves with the disrupter device, and wherein the at least one memory comprises computer readable code to:
   prompt the user, by the display element, to remove at least one of the first real world partition member and the second real world partition member; and
   prompt the user, by the display element, to fire the disrupter device so that the projectile travels along a flight path that is equal to the aiming vector and impacts the target of interest.

25. The system according to claim 20, wherein the at least one memory further comprises computer readable code to:
   determine, by the at least one processor, a centroid of the object of interest;
   generate, by the at least one processor, indicia at the centroid of the object of interest; and
   display, by the display element, the indicia at the centroid of the object of interest.

26. The system according to claim 25, wherein the indicia comprises a geometrical shape.

27. The system according to claim 20, wherein the fiducial markers on the first real world partition member are arranged in a first predetermined pattern and wherein the fiducial markers on the second real world partition member are arranged in a second predetermined pattern.

28. The system according to claim 27, wherein the first predetermined pattern is substantially the same as the second predetermined pattern.

29. The system according to claim 20, wherein the each fiducial marker comprises a tungsten disc.

30. The system according to claim 20, wherein the at least one memory further comprises computer readable code to:
   determine, by the at least one processor, orthogonality of the first x-ray radiation with respect to the first real world partition member; and
   determine, by the at least one processor, orthogonality of the second x-ray radiation with respect to the second real world partition member.

31. The system according to claim 20, wherein the at least one memory further comprises computer readable code to colorize each icon in the virtual depiction that represents a fiducial marker with a different color.

32. The system according to claim 20, further comprising computer readable code for generating, by the at least one processor, a virtual depiction of the objects inside the enclosed opaque article;
   displaying, by the display element, the virtual depiction;
   colorizing, by the at least one processor, the object of interest shown in the virtual depiction with a first color;
   colorizing, by the at least one processor, any hazardous objects shown in the virtual depiction with a second color; and
   colorizing, by the at least one processor, neutral objects shown in the virtual depiction with a third color.

33. The system according to claim 20, wherein the first real world partition member and the second real world partition member are pivotally attached to each other such that first real world partition member is pivotable with respect to the second real world partition member, and wherein both the first real world partition member and the second real world partition member form an adjustable frame and each of the first real world partition member and the second real world partition member defines a plane.

34. The system according to claim 33, wherein the adjustable frame is configured so that the plane of one of the first real world partition member and the second real world partition member is substantially perpendicular to the other said first real world partition member and the second real world partition member.

35. The system according to claim 20, further comprising a first x-ray film being positioned such that the enclosed opaque container being situated between the first real world partition member and the first x-ray film, wherein the first x-ray film is aligned with the first real world partition member, and wherein the first x-ray image is formed on the first x-ray film.

36. The system according to claim 20, further comprising a second x-ray film being positioned such that the enclosed, opaque container being situated between the second real world petition member and the second x-ray film, wherein the second x-ray film is aligned with the second real world partition member, and wherein the second x-ray image is formed on the second x-ray film.

37. The system according to claim 36, further comprising a digital scanning apparatus for digitally scanning the first x-ray film for generating the first digital x-ray image and digitally scanning the second x-ray image for generating the second digital x-ray image.

38. The system according to claim 20, wherein the apparatus for generating the first x-ray radiation and the second x-ray radiation comprises a portable x-ray machine.

39. The system according to claim 20, wherein the apparatus for generating the first x-ray radiation and the second x-ray radiation comprises:
   a first portable x-ray machine to generate radiation in the direction of the first real world partition member; and
   a second portable x-ray machine to generate radiation in the direction of the second real world partition member.

40. The system according to claim 20, wherein the image capturing device comprises a digital camera.

41. The system according to claim 40, further comprising a smart phone, wherein the smart phone comprises the digital camera, the display element, at least one processor and the at least one memory.

* * * * *